US010416660B2

(12) United States Patent
Maturana

(10) Patent No.: US 10,416,660 B2
(45) Date of Patent: Sep. 17, 2019

(54) DISCRETE MANUFACTURING HYBRID CLOUD SOLUTION ARCHITECTURE

(71) Applicant: Rockwell Automation Technologies, Inc., Mayfield Heights, OH (US)

(72) Inventor: Francisco P. Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 115 days.

(21) Appl. No.: 15/692,213

(22) Filed: Aug. 31, 2017

(65) Prior Publication Data
US 2019/0064787 A1 Feb. 28, 2019

(51) Int. Cl.
*G05B 23/02* (2006.01)
*G06F 9/50* (2006.01)

(52) U.S. Cl.
CPC ..... *G05B 23/0227* (2013.01); *G05B 23/0283* (2013.01); *G05B 23/0294* (2013.01); *G05B 2223/06* (2018.08); *G06F 9/5072* (2013.01)

(58) Field of Classification Search
CPC ............ G05B 23/0227; G05B 23/0294; G05B 23/0283; G05B 2223/06; G06F 9/5072
See application file for complete search history.

(56) References Cited

U.S. PATENT DOCUMENTS 5,159,685 A    10/1992  Kung
5,519,605 A    5/1996   Cawlfield
6,230,010 B1   5/2001   Morris
6,609,034 B1   8/2003   Behrens et al.
6,640,241 B1   10/2003  Ozzie et al.
6,675,226 B1   1/2004   Nair et al.
(Continued)

FOREIGN PATENT DOCUMENTS

CN    1755564    4/2006
CN    1937559    3/2007
(Continued)

OTHER PUBLICATIONS

Non-Final Office Action for U.S. Appl. No. 15/271,752 dated Apr. 13, 2018, 56 pages.
(Continued)

*Primary Examiner* — Charles R Kasenge
(74) *Attorney, Agent, or Firm* — Amin, Turocy & Watson, LLP

(57) ABSTRACT

A hybrid data collection and analysis infrastructure combines edge-level and cloud-level computing to perform high-level monitoring and control of industrial systems and processes. Edge devices located on-premise at one or more plant facilities can collect data from multiple industrial devices on the plant floor and perform local edge-level analytics on the collected data. In addition, the edge devices maintain a communication channel to a cloud platform executing cloud-level data collection and analytic services. As necessary, the edge devices can pass selected sets of data to the cloud platform, where the cloud-level analytic services perform higher level analytics on the industrial data. The hybrid architecture operates in a bi-directional manner, allowing the cloud-level and edge-level analytics to send control instructions to industrial devices based on results of the edge-level and cloud-level analytics.

20 Claims, 16 Drawing Sheets

(56) References Cited

U.S. PATENT DOCUMENTS

| | | |
|---|---|---|
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 8,618,941 B2* | 12/2013 | Javey .................. H04Q 9/00 340/605 |
| 8,649,500 B1 | 2/2014 | Cohen et al. |
| 8,694,770 B1 | 4/2014 | Osburn, III |
| 9,438,648 B2* | 9/2016 | Asenjo ............. H04L 65/403 |
| 9,489,832 B2* | 11/2016 | Nair .................. G08C 17/02 |
| 9,552,143 B2* | 1/2017 | Javey .................. H04Q 9/00 |
| 9,928,724 B2* | 3/2018 | Alcorn ................ G01F 1/34 |
| 9,954,972 B2* | 4/2018 | Asenjo ............. H04L 65/403 |
| 10,229,579 B2* | 3/2019 | Alcorn ................ G01F 1/34 |
| 2001/0053992 A1 | 12/2001 | Eto et al. |
| 2002/0133270 A1 | 9/2002 | Hung et al. |
| 2002/0178159 A1 | 11/2002 | O'Brien |
| 2003/0014387 A1 | 1/2003 | Kreidler et al. |
| 2003/0033237 A1 | 2/2003 | Bawri |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1 | 7/2005 | Martin et al. |
| 2005/0193285 A1 | 9/2005 | Jeon |
| 2005/0281263 A1 | 12/2005 | Miyamoto et al. |
| 2006/0068762 A1 | 3/2006 | Baldwin et al. |
| 2006/0174707 A1* | 8/2006 | Zhang ................ G01M 3/243 73/592 |
| 2006/0294047 A1 | 12/2006 | Johnston et al. |
| 2007/0019641 A1 | 1/2007 | Pai et al. |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0052409 A1 | 2/2009 | Chen et al. |
| 2009/0089227 A1 | 4/2009 | Sturrock et al. |
| 2009/0172637 A1 | 7/2009 | Parikh |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0256794 A1 | 10/2010 | McLaughlin et al. |
| 2010/0256795 A1 | 10/2010 | McLaughlin et al. |
| 2010/0257228 A1 | 10/2010 | Staggs et al. |
| 2010/0289652 A1* | 11/2010 | Javey .................. H04Q 9/00 340/605 |
| 2010/0318392 A1 | 12/2010 | Cassels et al. |
| 2011/0060907 A1 | 3/2011 | Hartmann et al. |
| 2011/0066298 A1 | 3/2011 | Francino et al. |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0144202 A1 | 6/2012 | Counterman |
| 2012/0166963 A1 | 6/2012 | Kohli et al. |
| 2012/0232869 A1 | 9/2012 | Maturana et al. |
| 2012/0237016 A1 | 9/2012 | Hegde et al. |
| 2012/0304247 A1 | 11/2012 | Badger et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1 | 7/2013 | Kephart et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0147064 A1 | 2/2014 | Maturana et al. |
| 2014/0115592 A1 | 4/2014 | Frean et al. |
| 2014/0156234 A1 | 6/2014 | Maturana et al. |
| 2014/0157368 A1 | 6/2014 | Shah et al. |
| 2014/0164124 A1 | 6/2014 | Rhoads |
| 2014/0207868 A1 | 7/2014 | Gordon et al. |
| 2014/0245208 A1* | 8/2014 | Javey .................. H04Q 9/00 715/771 |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0280796 A1 | 9/2014 | Pijewski |
| 2014/0282015 A1 | 9/2014 | Nixon et al. |
| 2014/0336785 A1 | 11/2014 | Asenjo et al. |
| 2014/0336791 A1* | 11/2014 | Asenjo ............ G05B 13/026 700/44 |
| 2014/0336795 A1 | 11/2014 | Asenjo et al. |
| 2014/0337429 A1* | 11/2014 | Asenjo ............. H04L 65/403 709/204 |
| 2014/0337473 A1 | 11/2014 | Frusina et al. |
| 2015/0113627 A1 | 4/2015 | Curtis et al. |
| 2015/0120821 A1 | 4/2015 | Bendell |
| 2015/0220080 A1 | 8/2015 | Nixon et al. |
| 2015/0277406 A1 | 10/2015 | Maturana et al. |
| 2015/0281319 A1 | 10/2015 | Maturana et al. |
| 2015/0281355 A1 | 10/2015 | Maturana et al. |
| 2015/0281453 A1 | 10/2015 | Maturana et al. |
| 2015/0287318 A1* | 10/2015 | Nair .................. G08C 17/02 340/5.52 |
| 2015/0316904 A1* | 11/2015 | Govindaraj ........ G05B 13/0205 700/28 |
| 2015/0324502 A1 | 11/2015 | Eberhardt |
| 2015/0363902 A1* | 12/2015 | Wada .................. G06Q 10/063 705/325 |
| 2015/0381744 A1 | 12/2015 | Na |
| 2016/0023351 A1 | 1/2016 | Kuffner et al. |
| 2016/0041565 A1* | 2/2016 | Edwards ............ E03C 1/00 700/282 |
| 2016/0112283 A1* | 4/2016 | Maturana ............ H04L 43/04 709/224 |
| 2016/0125487 A1* | 5/2016 | Hamby .............. G06Q 30/04 700/276 |
| 2016/0142396 A1 | 5/2016 | McRoberts et al. |
| 2016/0163179 A1 | 6/2016 | Matsumoto et al. |
| 2016/0179993 A1* | 6/2016 | Maturana ........... G06F 17/5009 703/7 |
| 2016/0182309 A1* | 6/2016 | Maturana ........... G06F 17/5009 709/224 |
| 2016/0256775 A1 | 9/2016 | Gustafson et al. |
| 2016/0335875 A1* | 11/2016 | Alcorn ................ G01F 1/34 |
| 2016/0349140 A1* | 12/2016 | Teymouri ........... G01M 3/2807 |
| 2016/0350093 A1 | 12/2016 | Walker et al. |
| 2017/0102693 A1 | 4/2017 | Kidd et al. |
| 2017/0102694 A1 | 4/2017 | Enver et al. |
| 2017/0212562 A1 | 7/2017 | Wang et al. |
| 2017/0238072 A1* | 8/2017 | Mackie ................ G01F 1/60 340/870.03 |
| 2018/0033087 A1* | 2/2018 | Delinselle ............ G06Q 40/08 |
| 2018/0182228 A1* | 6/2018 | Alcorn ................ G01F 1/34 |
| 2018/0300639 A1* | 10/2018 | Abbas ................. G06Q 10/04 |
| 2018/0356780 A1 | 12/2018 | Halabieh |
| 2018/0367560 A1* | 12/2018 | Mahaffey ........... H04L 63/1425 |
| 2019/0049332 A1* | 2/2019 | Shamir ............... G01M 3/2815 |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |

(56) References Cited

FOREIGN PATENT DOCUMENTS

| EP | 2541354 | 1/2013 |
|---|---|---|
| EP | 2592812 | 5/2013 |
| EP | 2660667 | 11/2013 |
| EP | 2704401 | 3/2014 |
| EP | 2 924 571 A2 | 9/2015 |
| WO | 01/15001 A2 | 3/2001 |

OTHER PUBLICATIONS

Final Office Action received for U.S. Appl. No. 14/562,233 dated Jun. 15, 2018, 35 pages.
Extended European Search Report received for EP Patent Application Serial No. 18182852.6 dated Nov. 22, 2018, 7 pages.
Communication Pursuant to Rule 69 EPC received for EP Patent Application Serial No. 18182852.6 dated Jan. 21, 2019, 2 pages.
Notice of Allowance received for U.S Appl. No. 15/795,512 dated Feb. 6, 2019, 105 pages.
Extended European Search Report received for EP Patent Application Serial No. 18187973.5 dated Dec. 14, 2018, 6 pages.
Non-Final Office Action received for U.S. Appl. No. 15/676,337 dated Mar. 6, 2019, 74 pages.
Communication Pursuant to Rule 69 EPC received for EP Patent Application Serial No. 18187973.5 dated Feb. 25, 2019, 2 pages.
Office Action for U.S. Appl. No. 14/634,174, dated Aug. 4, 2016, 11 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action from U.S. Appl. No. 14/525,144, dated Sep. 9, 2016, 28 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
"Steiner, J. G., et al., ""Kerberos: An Authentication Service for Open Network Systems,"" Proceedings of the Winter UsenixConference, Feb. 9, 1988, pp. 191-202.".
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Final Office Action for U.S. Appl. No. 14/562,233, dated Jul. 28, 2017, 33 pages.
Final Office Action for U.S. Appl. No. 14/639,279, dated Aug. 9, 2017, 66 pages.
Office Action for U.S. Appl. No. 14/639,279 dated Nov. 15, 2017, 75 pages.
Office Action for U.S. Appl. No. 14/562,233 dated Dec. 29, 2017, 36 pages.
Office Action for Chinese Application Serial No. 201510138371.0 dated Nov. 14, 2017, 5 pages.
Office Action for U.S. Appl. No. 15/431,128 dated Oct. 18, 2017, 37 pages.
European Office Action for European Application Serial No. 15160984.9 dated Feb. 15, 2018, 7 pages.
European Office Action for European Application Serial No. 15160941.9, dated Jan. 15, 2018, 5 pages.
European Office Action for European Application Serial No. 15160868.4, dated Jan. 10, 2018, 8 pages.
European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.
Final Office Action received for U.S. Appl. No. 15/271,752 dated Oct. 5, 2018, 35 pages.
Chinese Office Action and English Translation thereof dated Jul. 12, 2017, for Chinese Application Serial No. 201510138210.1, 17 pages.
Office Action for U.S. Appl. No. 14/525,149 dated Oct. 5, 2017, 88 pages.
Non-Final Office Action received for U.S. Appl. No. 15/271,752 dated Mar. 15, 2019, 32 pages.
Extended European Search Report received for EP Patent Application U.S. Appl. No. 18191111.6 dated Feb. 12, 2019, 12 pages.
Communication Pursuant to Rule 69 EPC received for EP Patent Application Serial No. 18191111.6 dated Mar. 18, 2019, 2 pages.
Non-Final Office Action received for U.S. Appl. No. 15/966,546 dated May 10, 2019, 177 pages.

(56) References Cited

OTHER PUBLICATIONS

Notice of Allowance received for U.S. Appl. No. 15/676,337 dated Jul. 9, 2019, 37 pages.

* cited by examiner

```xml
<Manifest xmlns:xsd="http://www.w3.org/2001/XMLSchema"                                    ←804
    xmlns:xsi="http://www.w3.org/2001/XMLSchema-instance">
    <ReleaseDate>2012-05-30T17:16:07.6290869-05:00</ReleaseDate>                          ←908
    <MetricManifest>F:\\Shweta_Development\\Manifest\\MetricsManifest.xml</MetricManifest>
    -<Customers>
        -<Customer>
            <CustomerName>Rockwell CMS</CustomerName>
            <CustomerId>1001</CustomerId>                                                  ←902
            -<Sites>
                -<Site>
                    <SiteId>101</SiteId>                                                   ←904
                    <SiteName>Rockwell Office</SiteName>
                    -<VSEs>
906→                    -<VSE>
                            <VSEId>1</VSEId>
                            <VSEName>Test Machine</VSEName>                                ←910
                            <VSETagManifest>F:\\Shweta_Development\\Manifest\\TagManifest.xml</VSETagManifest>
                            -<MessageTypes>
                                -<MessageType>
912→                                <MessageTypeName>Alarms</MessageTypeName>
                                    <MessageTypeId>0</MessageTypeId>
                                    -<AssemblyInfo>
914→                                    -<ProcessAssembly>
                                            <ProcessId>100011</ProcessId>                  ←916a <Namespace>CoreProcessAssembly.AlarmDataProcess</Namespace>

<AssemblyFileName>CoreProcessAssembly.dll</AssemblyFileName>
                                            <ReleaseDate>2012-05-30T17:16:08.2760869-05:00</ReleaseDate>
                                        </ProcessAssembly>
                                    </AssemblyInfo>
                                </MessageType>
                                -<MessageType>
                                    <MessageTypeName>Historical</MessageTypeName>
                                    <MessageTypeId>1</MessageTypeId>
                                    -<AssemblyInfo>
                                        -<ProcessAssembly>                                 ←916b
                                            <ProcessId>100011</ProcessId>

<Namespace>CoreProcessAssembly.HistoricalDataProcess</Namespace>
```

FIG. 9

```
<TagManifestReleaseDate="2012-05-30T017:16:07.6290869-05:00">
-<AnalyticsSystem>
  -<ControlSystems>
    -<ControlSystem ID = "1">
      -<Controllers>                                    ← 1006
        <Controller ID = "1.0" Project = "chassis1" connectedTo = "N1" />
        <Controller ID = "2.0" Project = "modularPLC" connectedTo = "N2" />
      </Controllers>
      -<Networks>
        <Network ID = "N1" Name = "TestNetwork1" />
        <Network ID = "N2" Project = "TestNetwork2" />
      </Networks>
    </ControlSystem>
    +<ControlSystem ID = "1">
  </ControlSystems>
-<Applications>
  -<Application ID = "1.1" Name = "TurboExpander1">       ← 1008
    -<Process>
      <Process ID = "1" Name = "NetPower" />
      <Process ID = "2" Name = "CycleEfficiency" />       ← 1004
      <Process ID = "3" Name = "PowerGuarantee" />
    </Process>
  </Application>
  +<Application ID = "1.2" Name = "TurboExpander2">
  +<Application ID = "1.3" Name = "TurboExpander3">
</Applications>
-<Tags>                                                   ← 1002
  <Tag Name = "GEN_REAL_POWER" Units = "MW" ownerProcessID = "1,2,3" ownerControllerID = "1.0" />
  <Tag Name = "MW_TOTAL_480_SUPPLY" Units = "MW" ownerProcessID = "1,2,3" ownerControllerID = "2.0" />
  <Tag Name = "WHRU_1_T_OIL_OUTLET_FLOW" Units = "m2/hr" ownerProcessID = "2,3" ownerControllerID = "1.0" />
  <Tag Name = "WHRU_1_T_OIL_IN_TEMP" Units = "C" ownerProcessID = "3" ownerControllerID = "2.0" />
  <Tag Name = "WHRU_1_T_OIL_OUTLET_TEMP" Units = "C" ownerProcessID = "2,3" ownerControllerID = "1.0" />
  <Tag Name = "WHRU_2_T_OIL_OUTLET_FLOW" Units = "m3/hr" ownerProcessID = "2,3" ownerControllerID = "2.0" />
  <Tag Name = "WHRU_2_T_OIL_IN_TEMP" Units = "C" ownerProcessID = "2" ownerControllerID = "2.0" />
  <Tag Name = "WHRU_1_T_OIL_OUTLET_TEMP" Units = "C" ownerProcessID = "2,3" ownerControllerID = "1.0" />
  <Tag Name = "AMBIENT_AIR_TEMP" Units = "C" ownerProcessID = "3" ownerControllerID = "1.0" />
  <Tag Name = "T_OIL_SUPPLY_TO_ORC_TEMP" Units = "C" ownerProcessID = "3" ownerControllerID = "1.0" />
  <Tag Name = "T_OIL_SUPPLY_RETURN_FROM_ORC_TEMP" Units = "C" ownerProcessID = "3" ownerControllerID = "2.0" />
</Tags>
</AnalyticsSystem>
</TagManifest>
```

```xml
<TagManifestReleaseDate="2012-05-30T017:16:07.6290869-05:00">
-<Metrics>
  -<MetricID = "1" Name = "NetPower">               ←—1102         ←—1104
    -<coefficients>
      <coefficient Name = "Cars/MWh/yr" Units = "MWh/yr" Value = "0.147" />
      <coefficient Name = "Himes/MWh/yr" Units = "MWh/yr" Value = "0.0883" />
    </coefficients>
    -<Thresholds>                                   ←—1106
      <Threshold Value = "0.593" Units = "TestUnit1" />
    </Thresholds>
  </Metric>
  -<MetricID = "2" Name = "CycleEfficiency">
    -<coefficients>
      <coefficient Name = "Therminol 59 Density Coefficients, Density(Temp[C]) - A" Units = "kg/m3" Value = "0.807" />
      <coefficient Name = "Therminol 59 Density Coefficients, Density(Temp[C]) - B" Units = "kg/m3" Value = "999.38" />
      <coefficient Name = "Therminol 59 Density Coefficients, Enthalpy(Temp[C]) - A" Units = "kj/kg" Value = "0.001694" />
      <coefficient Name = "Therminol 59 Density Coefficients, Enthalpy(Temp[C]) - B" Units = "kj/kg" Value = "29.28" />
    </coefficients>
    -<Thresholds>
      <Threshold Value = "1.823" Units = "TestUnit2" />
    </Thresholds>
  </Metric>
  -<MetricID = "3" Name = "PowerGuarantee">
    -<coefficients>
      <coefficient Name = "Therminol 59 Density Coefficients, Density(Temp[C]) - A" Units = "kg/m3" Value = "-0.807" />
      <coefficient Name = "Therminol 59 Density Coefficients, Density(Temp[C]) - B" Units = "kg/m3" Value = "999.38" />
```

FIG. 11

DISCRETE MANUFACTURING HYBRID CLOUD SOLUTION ARCHITECTURE

BACKGROUND

The subject matter disclosed herein relates generally to industrial data collection and analytics.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an edge device is provided, comprising a collection services component configured to collect industrial data from data tags of an industrial device and to generate a compressed data file containing the industrial data, wherein the data tags from which the industrial data is collected are defined by an edge-level data manifest file; a queue processing component configured to package the compressed data file with header information based on message queuing information maintained in a message queuing data store to yield a compressed data packet and to send the compressed data packet to a cloud analytics system executing on a cloud platform; and an edge analytics component configured to perform an edge-level analytic procedure on a first subset of the industrial data to yield a first analytic result, wherein the edge-level analytic procedure is defined by an edge-level metrics manifest file, wherein the edge analytics component is configured to send a first command to the industrial device based on the first analytic result, the queue processing component is further configured to receive a second analytic result from the cloud analytics system, the second analytic result generated based on a cloud-level analytic procedure performed on a second subset of the industrial data by the cloud analytics system, and the edge analytics component is further configured to send a second command to the industrial device based on the second analytic result.

Also, one or more embodiments provide a method for processing industrial data, comprising collecting, by a system comprising a processor, industrial data from data tags of an industrial device, wherein the data tags from which the industrial data is collected are identified by an edge-level data manifest file; generating, by the system, a compressed data file containing the industrial data; adding, by the system, header information to the compressed data file to yield a compressed data packet, wherein the header information is based on message queuing information maintained in a message queuing data store to yield a compressed data packet; adding, by the system, header information to the compressed data file to yield a compressed data packet, wherein the header information is based on message queuing information maintained in a message queuing data store to yield a compressed data packet; sending, by the system, the compressed data packet to a cloud analytics system executing on a cloud platform; performing, by the system, an edge-level analytic procedure on a first subset of the industrial data to yield a first analytic result, wherein the edge-level analytic procedure is defined by an edge-level metrics manifest file; sending, by the system, a first command to the industrial device based on the first analytic result; receiving, by the system, a second analytic result from the cloud analytics system, wherein the second analytic result is generated based on a cloud-level analytic procedure performed on a second subset of the industrial data by the cloud analytics system; and sending, by the system, a second command to the industrial device based on the second analytic result.

Also, according to one or more embodiments, a non-transitory computer-readable medium is provided having stored thereon instructions that, in response to execution, cause an edge device to perform operations, the operations, comprising collecting industrial data from data tags of an industrial device, wherein the data tags from which the industrial data is collected are defined by an edge-level data manifest file; generating a compressed data file containing the industrial data; appending header information to the compressed data file to yield a compressed data packet, wherein the header information is based on message queuing information maintained in a message queuing data store to yield a compressed data packet; sending the compressed data packet to a cloud analytics system executing on a cloud platform; performing an edge-level analytic procedure on a first subset of the industrial data to yield a first analytic result, wherein the edge-level analytic procedure is defined by an edge-level metrics manifest file; sending a first control instruction to the industrial device based on the first analytic result; receiving a second analytic result from the cloud analytics system, wherein the second analytic result is generated based on a cloud-level analytic procedure performed on a second subset of the industrial data by the cloud analytics system; and sending a second control instruction to the industrial device based on the second analytic result.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is an example cloud-level system manifest.

FIG. 10 is an example cloud-level data manifest.

FIG. 11 is an example cloud-level metrics manifest.

DETAILED DESCRIPTION

Figure 1:
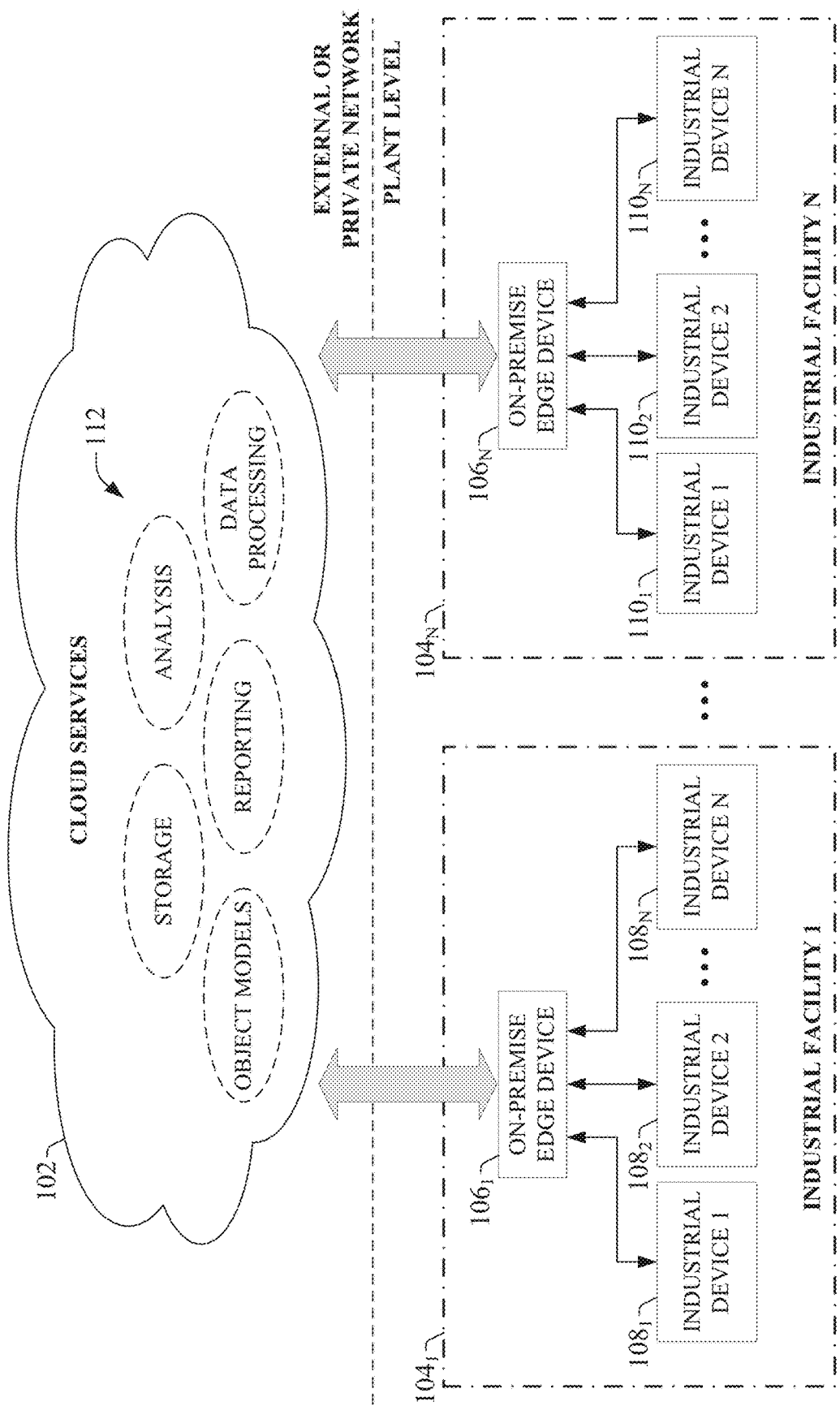
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e g, manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

To address these and other issues, one or more embodiments of the present disclosure provide a hybrid data collection and analysis infrastructure that combines edge-level and cloud-level computing. To this end, edge devices located on-premise at one or more plant facilities can collect data from multiple industrial devices on the plant floor and perform local edge-level analytics on the collected data. In addition, the edge devices maintain a communication channel to a cloud platform executing cloud-level data collection and analytic services. As necessary, the edge devices can pass selected sets of data to the cloud platform, where the cloud-level analytic services perform higher level analytics on the industrial data. The hybrid architecture operates in a bi-directional manner, allowing the cloud-level analytic services to send instructions or data values (e.g., setpoint values) to the edge devices based on results of the high-level cloud analytics. In turn, the edge devices can modify aspects of the controlled industrial processes in accordance with the instructions or new data values sent by the cloud platform services.

In an example scenario, edge-level analytics can be used to track hardware anomalies in industrial equipment, such as electro-pneumatic devices. Such edge-level analytics can include analytics designed to detect equipment degradation (e.g., compressed air pipe bursts, compressed air leaks, excessive vibration, etc.) that may be causing over-clamping or stack clamp conditions. In general, edge-level analytics can be used to identify anomalies that may have less stringent response time requirements relative to control-level monitoring, but faster response time requirements than anomalies tracked by the cloud-level analytics. The high-level cloud analytics can be designed to track and identify anomalies—such as position error accumulation—that have less stringent response time requirements relative to edge-level or control-level analytics. For example, cloud-level analytics can be designed to consider the stochastic nature of the manufacturing process, and use statistical process control (SPC) to monitor performance of the manufacturing process in general or specific items of equipment in particular.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise edge devices 106 can collect data from industrial devices 108 and 110, or from other data sources, including but not limited to data historians, business-level systems, etc. Edge devices 106 are configured to both perform local edge-level analytics on sets of the collected industrial data, as well as to send selected sets of the collected data—as well as selected results of the edge-level analytics—to cloud platform 102 for cloud-level processing and storage. Cloud platform 102 can be any infrastructure that allows cloud services 112 to be accessed and utilized by cloud-capable devices. For example, cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (e.g., cloud-level analytics, reporting services, notification services, etc.) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, cloud-level data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, edge devices 106 at the respective industrial facilities 104 may interact with cloud services 112 directly or via the Internet. In an exemplary configuration, the industrial devices 108 and 110 connect to the on-premise edge devices 106 through a physical or wireless local area network or radio link. Edge devices 106 and their associated data collection and processing services are discussed in more detail below.

As will be discussed in more detail herein, communication between edge devices 106 and the cloud services 112 is bidirectional, allowing analytic functions to be scaled across the edge devices 106 and cloud-level analytic components.

Ingestion of industrial device data in the cloud platform 102 through the use of edge devices 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Edge devices 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the edge device. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
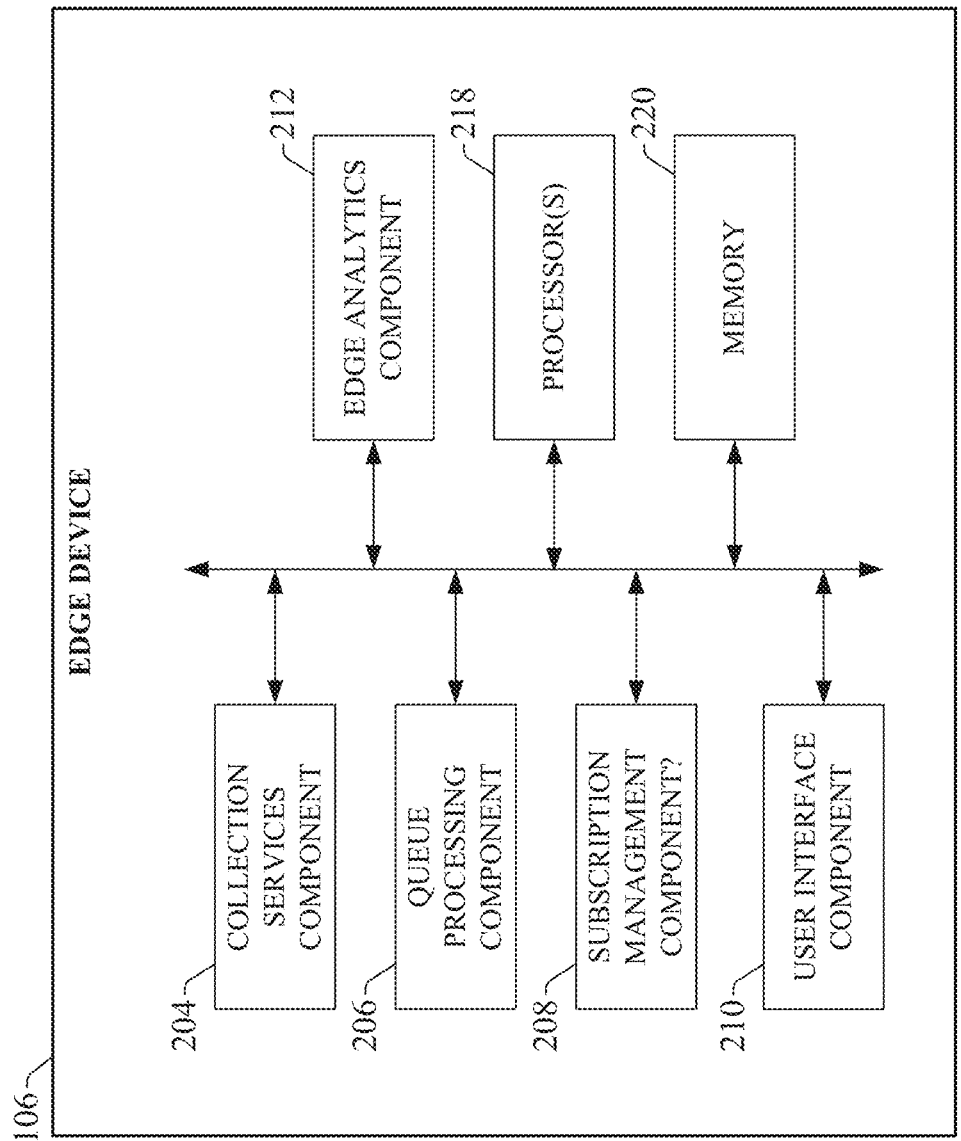
FIG. 2 is a block diagram of an example edge device.

FIG. 2 is a block diagram of an example edge device 106 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Edge device 106 can include a collection services component 204, a queue processing component 206, a subscription management component 208, a user interface component 210, an edge analytics component, one or more processors 218, and memory 220. In various embodiments, one or more of the collection services component 204, queue processing component 206, subscription management component 208, the user interface component 210, the edge analytics component 212, the one or more processors 218, and memory 220 can be electrically and/or communicatively coupled to one another to perform one or more of the functions of the edge device 106. In some embodiments, components 204, 206, 208, 210, and 212 can comprise software instructions stored on memory 220 and executed by processor(s) 218. Edge device 106 may also interact with other hardware and/or software components not depicted in FIG. 2. For example, processor(s) 218 may interact with one or more external user interface devices, such as a keyboard, a mouse, a display monitor, a touchscreen, or other such interface devices.

Collection services component 204 can be configured to collect industrial device data, either from a data concentrator or directly from the industrial devices themselves (e.g., industrial controllers, motor drives, etc.). Collection services component 204 can also be configured to pre-process subsets of the collected data for transmission to a cloud platform; e.g., by compressing the data and storing the data in a compressed data file. Queue processing component 206 can be configured to package a compressed data file prepared by the collection services component 204 into a data packet and push the data packet to the cloud platform. Subscription management component 208 can be configured to maintain customer-specific configuration and subscription information. This information can be accessed by the queue processing component 206 to determine how the compressed data file should be packaged, and how to connect to the customer's cloud platform for transmission of the data packets. Queue processing component 206 can also be configured to receive data, instructions, or results of cloud-level analytics from a cloud-level analytic service.

User interface component 210 can be configured to receive user input and to render output to the user in any suitable format (e.g., visual, audio, tactile, etc.). In some embodiments, user interface component 210 can be configured to communicate with a graphical user interface that executes on a separate hardware device (e.g., a laptop computer, tablet computer, smart phone, etc.) communicatively connected to cloud agent 202. In such configurations, user interface component 210 can receive input parameter data entered by the user via the graphical user interface, and deliver output data (e.g., drive performance metric data) to the interface.

Edge analytics component 212 can be configured to perform edge-level analytics on selected subsets of the collected industrial data. In some embodiments, edge analytics component 212 can be configured to work in conjunction with queue processing component 206 to facilitate sending selected results of the edge-level analytics, as well as any relevant industrial data, to the cloud platform for storage or cloud-level analytics. Edge analytics component 212 can also be configured to execute control modification instructions received from the cloud platform services. For example, if the cloud-level services decide, based on a result of cloud-level analytics, that an aspect of the controlled industrial process is to be modified (e.g., a setpoint modification, a change in operating speed, a change to a product output goal, etc.), edge analytics component 212 can send appropriate control instructions to the relevant industrial devices (e.g., industrial controller) to implement the change to the controlled process.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
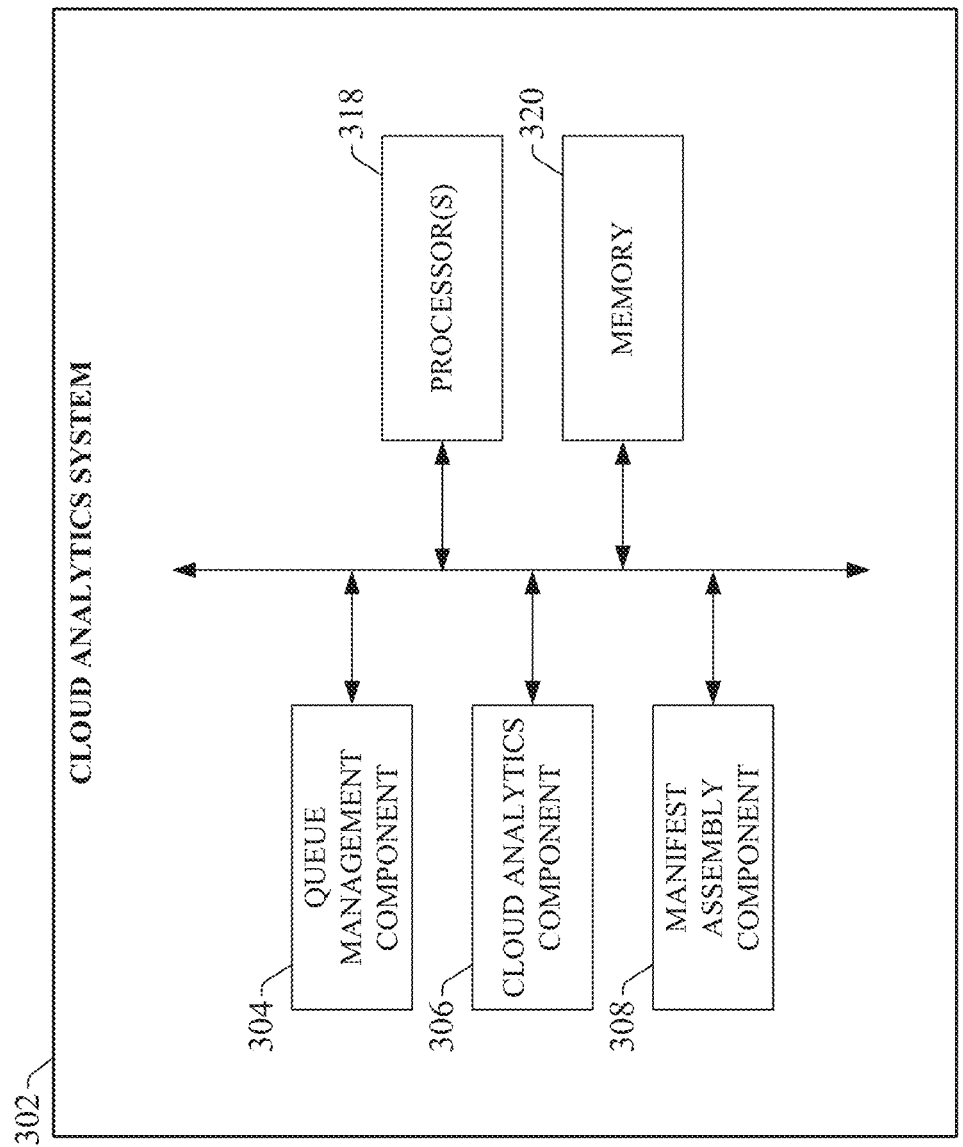
FIG. 3 is a block diagram of an example cloud analytics system.

FIG. 3 is a block diagram of an example cloud analytics system 302 according to one or more embodiments of this disclosure. Cloud analytics system 302 can include a queue management component 304, a cloud analytics component 306, a manifest assembly component 308, one or more processors 318, and memory 320. In various embodiments, one or more of the queue management component 304, cloud analytics component 306, manifest assembly component 308, the one or more processors 318, and memory 320 can be electrically and/or communicatively coupled to one another to perform one or more of the functions of the cloud analytics system 302. In some embodiments, components 304, 306, and 308, can comprise software instructions stored on memory 320 and executed by processor(s) 318. Cloud analytics system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Queue management component 304 can be configured to receive compressed data packets from one or more edge devices (e.g., edge device 106) residing at an industrial facility and organize the industrial data contained in the packets into priority queues that respectively define how the data packets are to be processed by cloud processing services. The cloud analytics component 306 can be configured to determine how the data in the respective queues is to be processed based on analytics manifests stored in a customer-specific manifest assembly. Manifest assembly component 308 can be configured to create, update, and manage manifests within customer-specific manifest assemblies on the cloud platform. The manifests define and implement customer-specific capabilities, applications, and preferences for processing collected data in the cloud, and can be uploaded by a user at the plant facility through an edge device.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
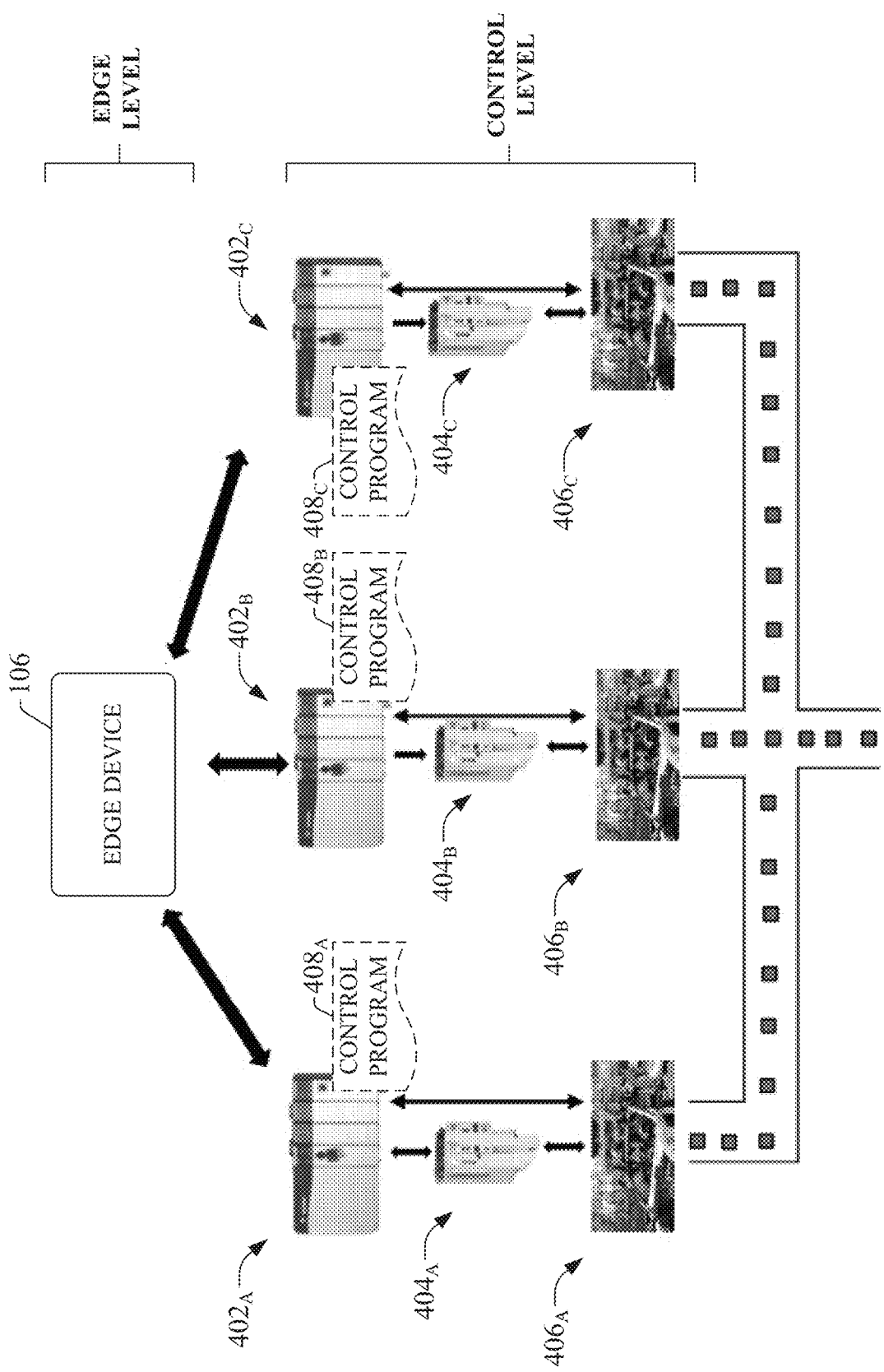
FIG. 4 is a generalized overview of an on-premise communication architecture comprising an edge device.

FIG. 4 is a generalized overview of an on-premise communication architecture comprising an edge device. In the illustrated example, an edge device 106 is communicatively connected to three industrial controllers $402_A$-$402_C$ that perform monitoring and control of respective three industrial automation systems $406_A$-$406_C$. Each controller $402_A$-$402_C$ can interface with industrial input and output devices that make up each automation system $406_A$-$406_C$ (e.g., pneumatic actuators and clamps, control panel pushbuttons and switches, photo-detectors, stack lights, etc.) via the controllers' digital and analog input and output modules. Controllers $402_A$-$402_C$ can also monitor and control one or more motors of the automation systems $406_A$-$406_C$ via motor drives $404_A$-$404_C$.

The control level of the architecture—comprising the industrial controllers $402_A$-$402_C$, motor drives $404_A$-$404_C$, and industrial I/O devices that make up the automation systems $406_A$-$406_C$—performs substantially real-time control of the controlled automation systems $406_A$-$406_C$, in accordance with the industrial control program $408_A$-$408_C$ executed by the controllers $402_A$-$402_C$, typically at a response time resolution within the range of microseconds to milliseconds.

In addition to this real-time control, edge device 106 can be configured to collect selected subsets of industrial data available on the industrial controllers $402_A$-$402_C$ or to collect selected subsets of industrial data available on the edge devices 106, and perform edge-level analytics on the collected data. Edge-level analytics carried out by edge analytics component 212 of edge device 106 will typically be directed to aspects of the controlled processes that are at a higher level of abstraction relative to real-time control, and that therefore do not require response times as fast as those supported by the control level devices. For example, edge device 106 may be configured to perform analytics that track hardware anomalies and identify possible equipment degradation based on analysis of collected controller data. In an example of such equipment health tracking, collection services component 204 may be configured to collect pneumatic pressure values from one or more of the industrial controllers $402_A$-$402_C$. Edge analytics component 212 may be configured to recognize pressure data signatures or patterns within the data indicative of a compressed air pipe burst or leak, and perform an action in response to recognition of such pressure signatures. The action may be a notification delivered to one or more client devices associated with appropriate plant personnel (sent by the queue processing component 206 via a cloud platform). The action may also be a control instruction directed to one or more of the industrial controllers $402_A$-$402_C$ by edge analytics component 212 to alter operation of one or more of the automation systems $406_A$-$406_C$ to compensate for the detected equipment deterioration event.

Edge analytics component 212 can also be configured to automatically anticipate a required maintenance event for an industrial device based on pattern monitoring of selected data values. For example, edge analytics component 212 may be configured to monitor performance of a pneumatic actuator or clamp and identify patterns within the monitored data indicative of an impending failure or performance degradation below an acceptable threshold. Identification of this performance issue can be based, for example, on a record of actuator position data during transitions between fully extended and fully retracted (or fully clamped and fully unclamped), a record of elapsed times required for the actuator or clamp to transition between its the two extreme positions, or other such data. Edge analytics component 212 can be configured to recognized patterns within this data indicative of a performance degradation in excess of an acceptable tolerance, and initiate a maintenance notification based on this determination.

Edge device 106 can also be configured to coordinate control events among the automation systems $406_A$-$406_C$, thereby performing collective supervisory control of the automation systems $406_A$-$406_C$. For example, if a product or part that is output by one of the automation systems $406_A$-$406_C$ is consumed at one or both of the other automation systems $406_A$-$406_C$ (e.g., in a scenario in which the automation systems $406_A$-$406_C$ are work cells of a common assembly line), edge analytics component 212 may be configured to regulate part flow between the automation systems automation systems $406_A$-$406_C$ based on such factors as rates of part production and part consumption at the respective automation systems, an anticipated demand defined by a user, identified device or machine failures, or other such factors.

Figure 5:
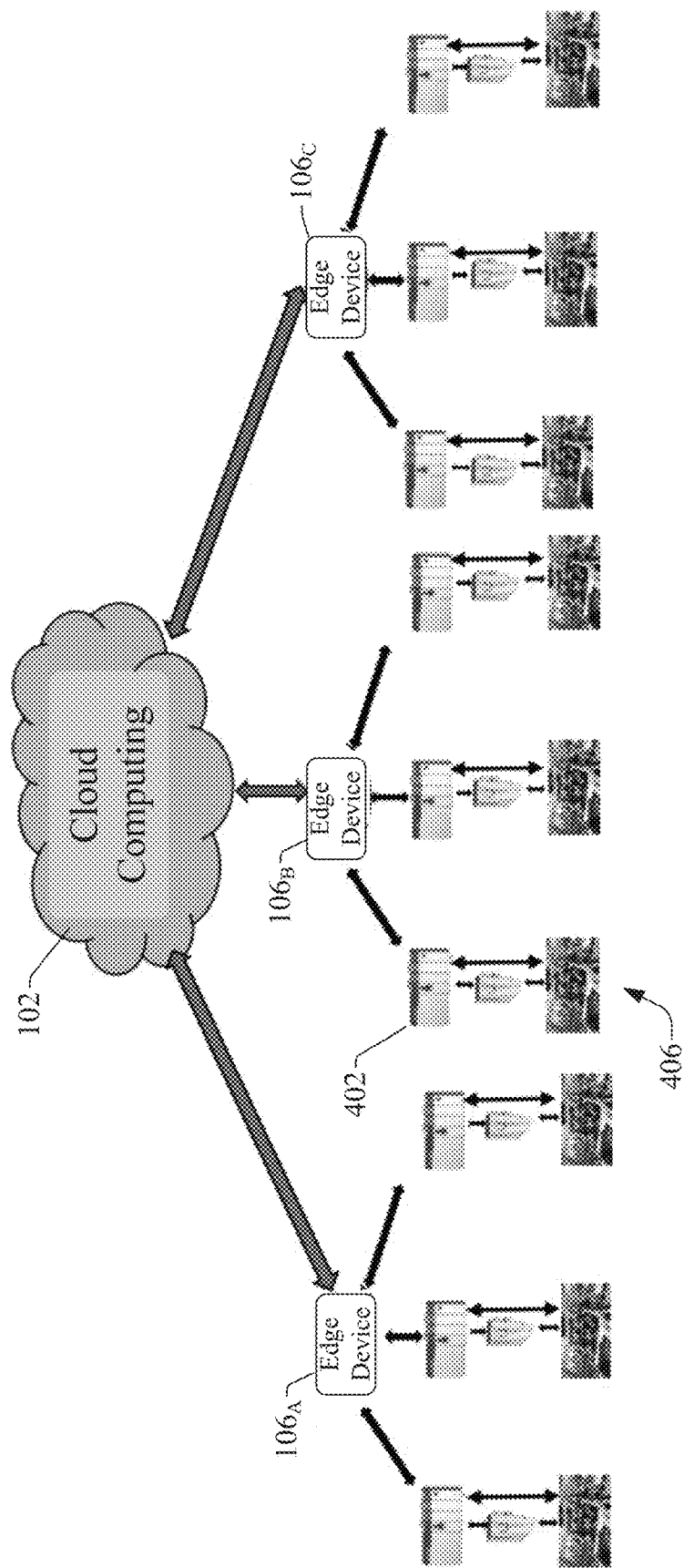
FIG. 5 is a generalized overview of a scalable computing architecture for industrial automation systems, which incorporates multiple edge devices that reside between control level devices and a cloud platform.

To yield a scalable, hybrid computing architecture that leverages both on-premise edge analytics as well as cloud analytics, edge devices 106 can be communicatively connected to cloud analytics system 302, which resides on a cloud platform 102 and executes cloud-level analytic services. FIG. 5 is a generalized overview of a scalable computing architecture for industrial automation systems, which incorporates multiple edge devices 106 that reside between control level devices and a cloud platform. Using this architecture, data and/or edge-level analytic results from edge devices 106 can be aggregated in edge devices 106 and/or pushed to cloud platform 102. Cloud-level analytics implemented by cloud analytics component 306 on the cloud platform 102 can apply analytics to selected sets of data from edge devices 106 to perform various functions.

In general, cloud-level analytics performed by cloud analytics component 306 can be directed to operational aspects that have less stringent response time requirements relative to those required by edge-level and control-level operations. For example, whereas control-level operations performed by industrial controllers 402 may require response times within microsecond to millisecond resolutions, and edge-level actions may require response times having millisecond to whole second resolutions, cloud-level analytics may be directed to functions requiring response times of seconds, minutes, or hours.

In an example scenario, cloud analytics component 306 can be configured to generate operating profiles for automation systems 406 or devices making up the systems 406 based on a relatively long-term monitoring of operational data received from the edge devices 106. Such profiles can include, for example, performance profiles for machines making up an automation system 406, energy consumption profiles for devices or automation systems 406, product throughput profiles for assembly lines or workcells within assembly lines, position error profiles for electro-pneumatic actuators (e.g., position accuracy data indicating an accuracy with which the actuators move to their instructed position), or other such profiles.

In general, edge-level analytics may be directed to tracking equipment anomalies that manifest slowly over time, such as gradual hardware performance degradations. This may include, for example, monitoring motion profiles of electro-pneumatic actuators and predicting, based on a comparison of the motion profiles with models of actuator degradation defined on the cloud platform, times at which maintenance should be performed on the actuators, or times at which the actuators should be replaced in order to mitigate hardware failure or significant performance degradation. In this way, cloud-level analytics carried out by cloud analytics component 306 can anticipate maintenance schedules for equipment monitored by the edge device 106.

Cloud analytics component 306 can perform health monitoring of the edge devices 106 themselves, identifying which edge devices are connected to the cloud platform 102 and operating properly.

Similar to the edge level of the architecture, which supports bi-directional communication with the control level devices (such as industrial controllers 402), the cloud analytics system 302 executing on cloud platform 102 supports bi-directional communication with edge devices 106, allowing the cloud analytics system 302 to issue control instructions to edge devices 106, or to industrial controllers 402 and/or drives 404 via the edge devices 106. For example, if a performance profile generated by cloud analytics component 306 indicates that an electro-pneumatic actuator or other industrial device is experiencing significant performance degradation or is at high risk of impending failure, cloud analytics component 306 can issue a command to the edge device 106 that performs supervisory control for the industrial controller 402 monitoring and controlling the actuator, where the command may instruct the controller to modify control of its associated automation system 406 to accommodate the detected performance degradation (e.g., by modifying the machine cycle to favor other actuators if possible, or by slowing the actuation time for the actuator in order to slow the rate of equipment degradation until the actuator can be replaced or repaired). Cloud analytics component 306 can also send a notification via a user interface served to a client device.

Figure 6:
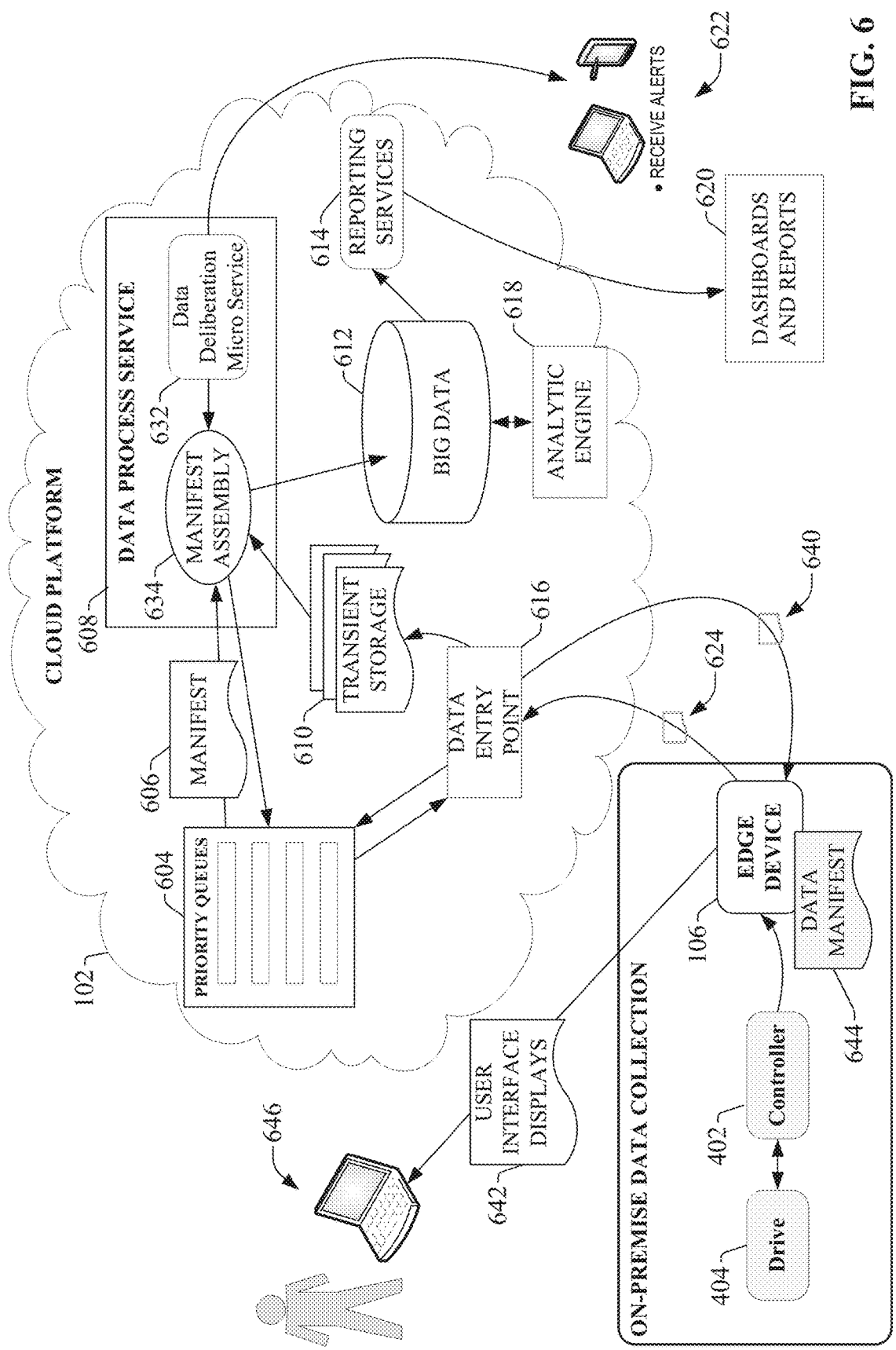
FIG. 6 is a diagram of an example industrial data collection and processing architecture that employs a hybrid computing approach that combines edge-level and cloud-level analytics.

FIG. 6 is an overview of an example industrial data collection and processing functional architecture that employs a hybrid computing approach that combines edge-level and cloud-level analytics. While hybrid industrial computing system is described herein as being used within the particular cloud architecture depicted in FIG. 6, it is to be appreciated that embodiments of the hybrid computing architecture are not limited to use with this illustrated architecture, but rather can be used to scale industrial analytics between edge devices and cloud platform devices within the context of other types of cloud architectures.

In the example illustrated in FIG. 6, edge device 106 collects data from an industrial controller 402 (e.g., from the data table maintained on the controller's local memory, which stores current values of the controller's digital and analog input and outputs, as well as internally computed values representing metrics associated with a controlled machine or industrial process). For example, edge device 106 can monitor one or more controller tags defined in a tag archive and store the monitored data in local data storage (e.g., a local structured query language, SQL server based storage or NOSql based storage, etc.) associated with the edge device 106 (e.g., memory 220). The collected data can include historical data (e.g., alarm history, status history, trend data, etc.), live data values read from the industrial assets, alarm data generated by the industrial assets, or other types of data Edge device 106 can execute on any suitable hardware platform (e.g., a server, a LINUX box, etc.), and acts as a gateway that collects data items from the various industrial controller 402 and/or other assets on the plant network and packages the collected data according to a generic, uniform data packaging schema used to move the on-premise data to a cloud platform 102. A data manifest file 644 defining the controller data points to be collected by the edge device 106 can be deployed to the edge device 106 to facilitate local configuration of the data collection and migration. Edge device 106 provides a scalable data type schema that allows new data types to be added without the need to redeploy the monitoring system to the cloud.

Figure 7:
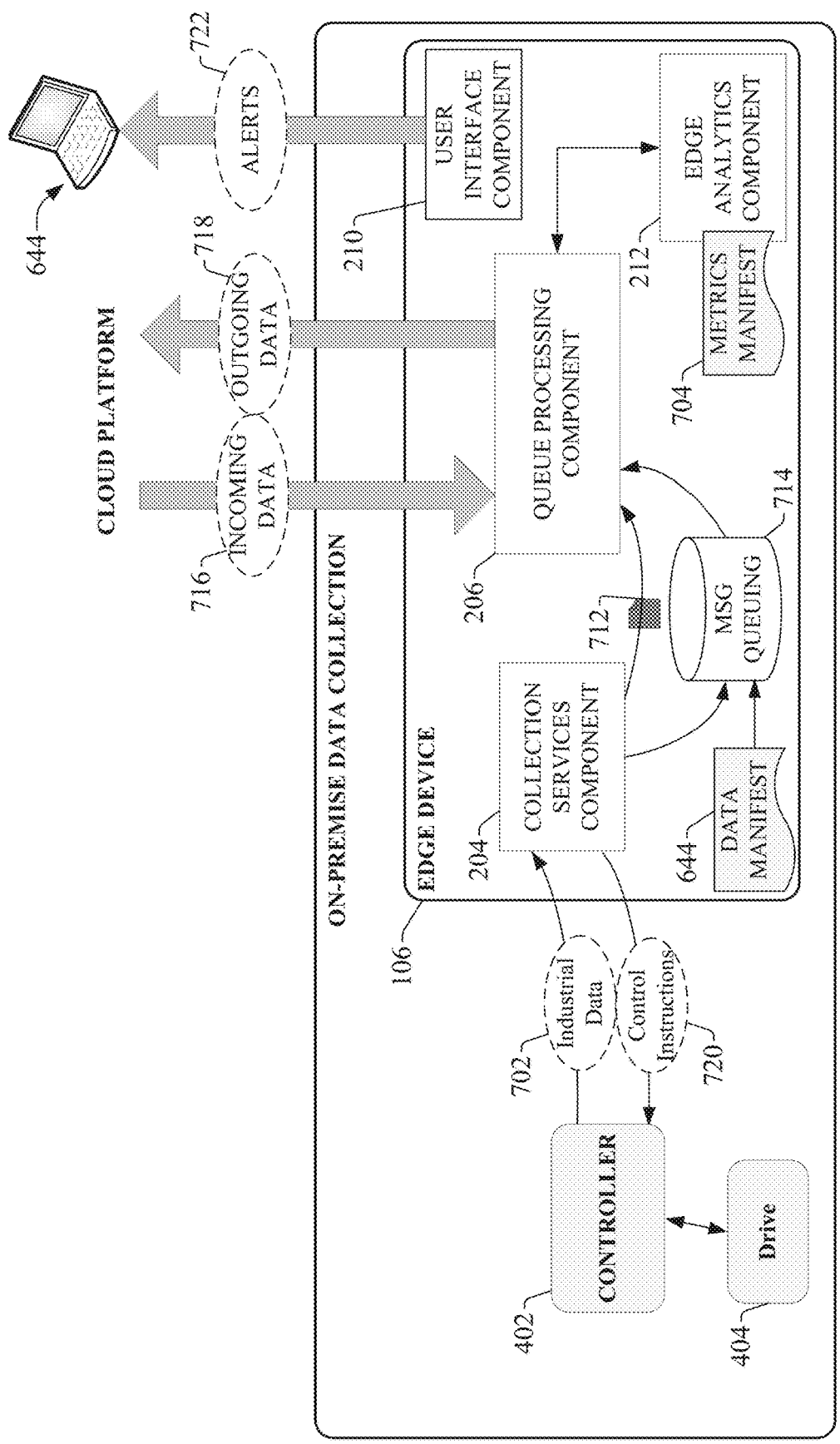
FIG. 7 is a block diagram illustrating on-premise data collection.

Example edge device 106 is illustrated in more detail with reference to FIG. 7. On-premise data collection is enabled by a collection of services that function to process data. As noted above, industrial data 702—such as controller data read from an industrial controller 402 and/or an associated motor drive—is collected from one or more industrial devices by collection services implemented by collection services component 204 of edge device 106. In some embodiments, edge device 106 can collect the industrial data 702 via a wired or wireless common industrial protocol (CIP) link or other suitable communication protocol. Collection services component 204 can then compress the data and store the data in a compressed data file 712.

Edge device 106 is configured to migrate the collected industrial data 702 to the cloud platform, as well as to perform user-defined edge-level analytics on selected subsets of the collected industrial data 702, wherein the edge-level analytics to be performed are defined by metrics manifest file 704. To facilitate migration of the collected data, queue processing services executed by queue processing component 206 can read the compressed data file 712 and reference a message queuing database 714, which maintains and manages customer-specific and operation-specific data collection configuration information defined by on-premise data manifest file 644, as well as information relating to the customer's subscription to the cloud platform and associated cloud services. Based on configuration information defined by data manifest file 644, queue processing component 206 packages the compressed data file 712 into a data packet and pushes the data packet to the cloud platform as outgoing data 718. In some embodiments, edge device 106 can support injecting data packets as torrential data. Configuration information in message queuing database 714 (including information specified by data manifest file 644) instructs edge device 106 how to communicate with the identified data tags of industrial assets such as controller 402 or drive 404, (e.g., by defining communication paths to the data tags for retrieval of industrial data 702), and with the remote data collection services on the cloud platform.

Communication between edge device 106 and cloud platform cloud analytics system 302 on cloud platform 102 is bi-directional. In addition to sending compressed data packets 624 to the cloud platform, edge device 106 can receive data packets 640 from cloud analytics system 302. These received data packets 640 can include control instructions or notifications generated by the cloud analytics system 302 based on results of cloud-level analytics on subsets of the industrial data sent by the edge device 106. The edge device's user interface component 210 can serve one or more user interface displays 642 to a client device 646 located on-premise and having a communicative link to edge device 106, and relay the notifications or summaries of the incoming commands to the client device 646 via these user interface displays 642. In the case of incoming control commands, edge device 106 may be configured to relay an incoming control command from the cloud platform 102 to the appropriate industrial controller only in response to receipt of confirmation input from the user via user interface displays 642.

In addition to direct migration of the collected data, edge analytics component 212 can be configured to perform edge-level analytics on portions of the collected industrial data 702. As discussed above, edge-level analytics can be viewed as having a scope that is a level higher in abstraction relative to control-level analytics carried out by industrial controller 402, or that has a less critical response time requirement relative to control-level analytics. For example, edge-level analytics may be directed to tracking equipment anomalies that may not otherwise be detected at the control-level, such as compressed air pipe bursts or air leaks, excessive equipment vibration or noise, or other such anomalies. Edge analytics component 212 can detect such anomalies, for example, by tracking trends of selected data points indicative of equipment health. For example, edge analytics component 212 may monitor selected pressure values over time and identify possible compressed air leaks or air pipe bursts based on detection of characteristic signatures or patterns within these time-based trends indicative of a pipe burst or leak.

When such anomalies are detected, queue processing component 206 may send a notification of the potential equipment failure to the cloud platform as outgoing data 718, so that cloud services can deliver the notifications to client devices associated with suitable plant personnel. Also, as described above in connection with FIGS. 4 and 5, edge device 106 can also generate and send instructions to the industrial devices (e.g., industrial controllers 402) in response to detection of an anomaly that requires a change to the industrial process carried out by one or more of the industrial devices. For example, in response to detection of a possible pressure leak in an air pipe, edge device 106 may send a control instruction 720 to the appropriate industrial controller 402 to alter the controlled process such that the affected pipe is bypassed or assigned a lower usage priority, or such that the controlled process slowed in order to reduce the rate of further equipment deterioration until maintenance can be performed.

The edge device's user interface component 210 can also be configured to deliver one or more alerts 722 to one or more client devices 644 notifying of the detected anomaly. In some embodiments, the edge device 106 may be configured to first deliver alert 722 to a client device 646 prior to sending the control instruction 720. The alert 722 can convey the nature of the detected anomaly and the proposed countermeasure that will be implemented by the control instruction 720 (e.g., diverting product to a different line, initiating a slow operation mode, bypassing a device that is experiencing the anomaly, etc.). Edge device 106 will then await receipt of user input from client device 646 confirming acceptance of the proposed countermeasure, and will only send control instruction 720 to the relevant controller 402 in response to receipt of the user confirmation. In some embodiments, the response of the edge device—in terms of notifications or alterations to be implemented in the controlled process in response to various types of identified anomalies—can be defined by the edge-level metrics manifest 704.

Edge device 106 is also configured to receive and process incoming data 716 from cloud analytics system 302 executing on the cloud platform 102, or from a higher level edge device. Incoming data 716 can comprise a notification or a control command generated by the cloud analytics system 302 or another edge device based on a result of analytics performed by those other systems. Similar to locally generated control and notification actions, edge device 106 can relay the notification or a summary of the received command to a client device 646 as an alert 722. In the case of incoming control commands, edge device 106 can also relay the command to the relevant controller 402 as a control instruction 720, either in response to receipt of the incoming command or in response to a confirmation input received from the user via user interface component 210.

In addition to detection of maintenance events, since the edge device 106 can be communicatively connected to multiple industrial controllers, edge-level analytics can also be used to regulate part flow through multiple work cells or areas of a plant that are being monitored by an edge device 106. For example, edge device 106 may detect, based on data collected from a first industrial controller associated with a downstream workcell, that the downstream workcell is overloaded with product or out of service. In response to this determination, the edge device can send a control instruction to a second industrial controller associated with an upstream workcell that provides product to the downstream workcell, where the instruction may instruct the second industrial controller to slow or temporarily cease production of parts while the downstream workcell is unavailable. In this way, edge device can facilitate efficient operation across multiple interconnected workcells.

In addition to collection, analytics, and migration of data, one or more embodiments of edge device 106 can also perform local pre-processing on the data (or results of the edge-level analytics) prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, edge device 106 may be configured to compress the collected data using any suitable data compression algorithm prior to migrating the data to the cloud platform. This can include detection and deletion of redundant data bits, truncation of precision bits, or other suitable compression operations. In another example, edge device 106 may be configured to aggregate data by combining related data from multiple sources. For example, data from multiple sensors measuring related aspects of an automation system can be identified and aggregated into a single cloud upload packet by edge device 106. Edge device 106 can also encrypt sensitive data prior to upload to the cloud. In yet another example, edge device 106 may filter the data according to any specified filtering criterion (e.g., filtering criteria defined in a filtering profile stored on the cloud agent device). For example, defined filtering criteria may specify that pressure values exceeding a defined setpoint are to be filtered out prior to uploading the pressure values to the cloud.

In some embodiments, edge device 106 can also transform a specified subset of the industrial data from a first format to a second format in accordance with a requirement of a cloud-based analysis application. For example, a cloud-based reporting application may require measured values in ASCII format. Accordingly, edge device 106 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Edge analytics component 212 may also associate metadata with selected subsets of the data prior to migration to the cloud, thereby contextualizing the data within the industrial environment. For example, edge analytics component 212 can tag selected subsets of the data with a time indicator specifying a time at which the data was generated, a quality indicator, a production area or station indicator specifying a work site (e.g., a fracking station, a mining station, a power plant, etc.) or a production area within an industrial enterprise from which the data was collected, an asset state indicator specifying a state of an industrial asset at the time the data was generated, a personnel identifier specifying an employee on duty at the time the data was generated, or other such contextual metadata. In this way, edge device 106 can perform layered processing of the collected data to generate meta-level knowledge that can subsequently be leveraged by cloud-based analysis tools to facilitate enhanced analysis of the data in view of a larger plant context.

To ensure secure outbound traffic to the cloud platform, one or more embodiments of edge device 106 can support HTTPS/SSL, certificate authority enabled transmission, and/or unique identity using MAC addresses. Edge device 106 can also support store-and-forward capability to ensure data is not lost if the agent becomes disconnected from the cloud.

Returning now to FIG. 6, edge device 106 sends compressed data packet 624—comprising encapsulated industrial data and/or results of edge-level analytics—to the cloud-based data collection and monitoring system on cloud platform 102 via a data entry point 616. The data packet 624 conveys parameters and data (compressed and serialized) used by the cloud-side services to reconstruct the domain data structure in the cloud using auxiliary tenant-level manifests. The cloud services direct remote storage of the received data via preconditioned transient storage 610. The cloud platform 102 can use agent reasoning and collective bargain features to determine a data storage locale.

Through the configuration interface provided by edge device 106 (or through another configuration interface configured to configure data processing in the cloud platform 102), users at the industrial site can dynamically configure one or more priority queues 604 (also referred to as data queues) that respectively define how the data packets are processed in the cloud platform 102. For example, separate queues may be defined for alarms, live data, historical data, or other data categories, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and edge device 106 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time data monitored for the industrial assets (e.g., controller 402, drive 404, etc.), such as current temperatures, current pressures, etc. The live data values can also be accessed through the API (e.g., a SQL API).

The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, edge device 106 can allow the user to define these priority queues 604 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through edge device 106, users can assign priorities to respective data tags or tag groups at the customer site. These priority assignments can be stored in the message queuing database 714 of edge device 106. Accordingly, when queue processing component 206 packages the collected data to be moved to the cloud platform 102, the collected data items can be packaged into data packets according to priority (as defined in message queuing database 714), and the respective data packet headers populated with the appropriate priority level. If access to the cloud platform is unavailable, data will continue to be collected by collection services component 204 and stored locally on the cloud agent in local storage associated with collections services. When communication to the cloud platform is restored, the stored data will be forwarded to cloud storage. Queue processing services can also encrypt and send storage account keys to the cloud platform for user verification.

In some embodiments, message queuing services implemented by queue processing component 206 encapsulate or package the compressed data file by adding customer-specific header information to yield a compressed data packed (e.g., compressed data packet 624 of FIG. 6). For example, the queue processing component 206 can access a message queuing database (e.g., message queuing database 714 of FIG. 7), which stores customer site configuration information and manages the customer's subscription to the cloud platform services. The message queuing database 714 may include such information as a customer identifier associated with the customer entity associated with the industrial enterprise, a site identifier associated with a particular industrial site from which the data was collected, a priority to be assigned to the data (which may be dependent on the type of information being sent; e.g., alarm data, historical data, live operational data, etc.), information required to facilitate connection to the customer's particular cloud storage fabric, or other such information.

When edge device 106 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 604 based on the priority. On the other side of the priority queues 604, a data process service 608 processes data in the respective priority queues 604 according to the predefined processing definitions. The data processing service includes a data deliberation micro service 632 that determines how the queued data is to be processed based on cloud-level manifest data 606 (e.g., system manifests, tag manifests, and/or metrics manifests) stored in a customer-specific manifest assembly 634. Manifest data 606 defines and implements customer-specific and operation-specific capabilities, applications, and preferences for processing collected data in the cloud. In some embodiments, cloud-level manifest data 606 can be dynamically uploaded to the cloud platform 102 by edge device 106, which facilitates dynamic extension of cloud computing capability.

Once the cloud-based infrastructure has processed and stored the data provided by edge device 106 according to the techniques described above, the data—or analytic results generated as a result of processing the data—can be made accessible to client devices 622 for viewing. In some embodiments, data analytics on the cloud platform 102 can provide a set of web-based and browser-enabled technologies for retrieving, directing, and uncompressing the data from the cloud platform 102 to the client devices 622. To this end, reporting services 614 can deliver data in cloud storage (e.g., from the big data storage 612) to the client devices 622 in a defined format. For example, reporting services 614 can leverage collected data stored in the cloud repository to provide remote operator interfaces to client devices 622 over the Internet. An analytic engine 618 executing on the cloud platform 102 (implemented by cloud analytics component 306) can also perform various types of analysis on the data stored in big data storage 612 and provide results to client devices 622.

Since the edge device 106 encapsulates the on-premise data collected from industrial assets into envelopes containing customer-specific and application-specific information, the compressed data packets convey the parameters and data required by the cloud analytics system 302 executing on cloud platform 102 to identify the appropriate manifest stored in the customer's manifest assembly (e.g., manifest assembly 634) for handling, processing, and/or routing of the data contained in the compressed data file.

Figure 8:
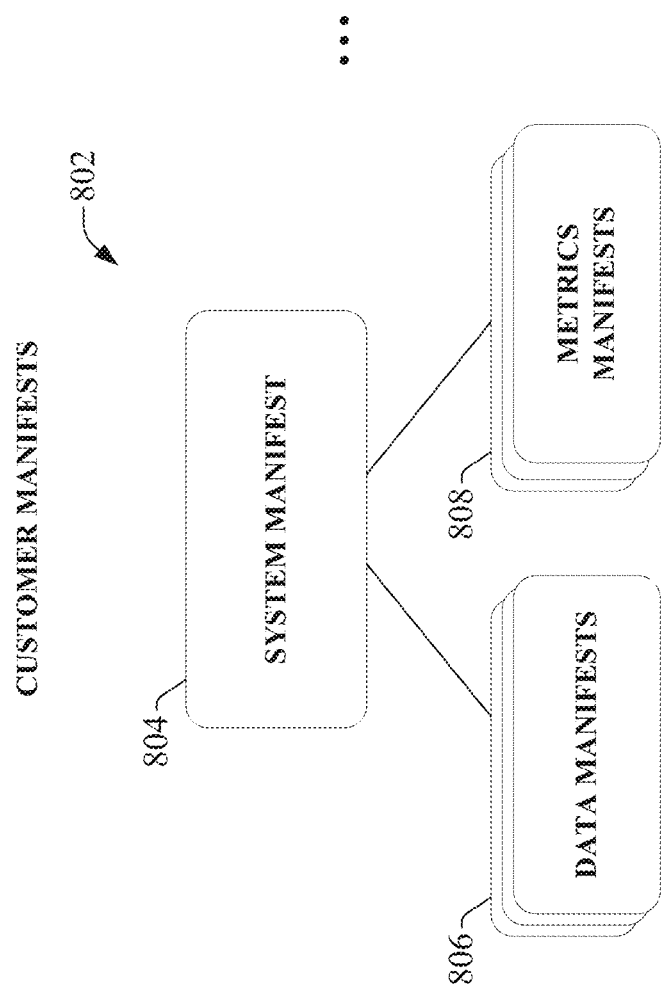
FIG. 8 is a conceptual diagram of an example manifest assembly.

Since the edge device 106 encapsulates the on-premise data collected from data collection applications into envelopes containing customer-specific and application-specific information, the compressed data packets convey the parameters and data required by the cloud to identify the appropriate cloud-level manifest stored in the customer's manifest assembly (e.g., manifest assembly 634) for handling, processing, and/or routing of the data contained in the compressed data file. FIG. 8 is a conceptual diagram of an example manifest assembly 802. In this example, a system manifest 804 resides in the manifest assembly 634. System manifest 804 can correspond to a particular data collection device (e.g., an edge device 106), and can include links to customer-specific and application-specific cloud-level data manifests 806 and metrics manifests 808 that define cloud-level actions that can be performed on the data received from that data source. When a compressed data packet (e.g., compressed data packet 624 of FIG. 5) is received at the cloud platform from an edge device 106, data process service 608 uses information packaged in the header of the packet to identify the appropriate manifest assembly (system manifest 804, data manifest 806, and metrics manifest 808) for processing the data contained in the compressed data file

712. Data deliberation micro service 632 fetches and loads the identified manifest assembly, which is then executed on the received data. In general, the metrics manifest 808—which is a cloud-level metrics manifest separate from the edge-level metrics manifest 704 that executes on edge device 106—identifies one or more generic procedures that can be retrieved and executed on the data, as well as application-specific ranges, coefficients, and thresholds that may be passed to the retrieved procedures as parameters. The cloud-level data manifest 806—separate from the edge-level data manifest 664 residing on edge device 106—identifies tag names used to map the data items in the compressed data file to variables or tags defined in the retrieved generic procedures.

Cloud-level metrics manifest 808 defines one or more cloud-level analytic procedures (e.g., identified by a process identifier field in the header of the compressed data packet) that can be carried out on the data. The metrics manifest 802 also defines the coefficients, thresholds, and ranges to be used for each identified analytic procedure or algorithm. In some embodiments, each analytic procedure can correspond to a generic procedure stored on the cloud platform in association with the manifest assembly 634. Metrics manifest 808 defines which of the available generic procedures are to be used to process the data received in the packet.

Data deliberation micro service 632 uses fields of the header of the data packet 624 (e.g., customer identifier, site identifier, procedure identifier fields, etc.) to navigate the corresponding levels of the system manifest 804 and select a particular cloud-level data manifest 806 for processing of the data. Cloud-level data manifest 806 defines tag names used to map data items in the compressed data file to the one or more metrics (analytic procedures) that will operate on the data, as defined by the metrics manifest 808. The cloud-level data manifest 806 also identifies which process identifiers have ownership over each tag name. The particular process that will be executed on the data can be identified by the message type and process identifier fields of the header. In this regard, the system manifest may define multiple message types (e.g., alarms, historical data, live data, etc.), and, for each defined message type, define one or more namespaces corresponding to a given process identifier. The namespaces identify corresponding applications or analytic algorithms stored in association with the manifest assembly 634 that can be loaded by data deliberation micro service 632 and executed on the data contained in the encapsulated data file. These applications may specify a final destination for the data (e.g., big data storage on the cloud, one or more specified client devices, a visualization application, etc.), or may comprise algorithms or computational procedures to be carried out on the data to yield a desired result (e.g., a net power calculation, an efficiency calculation, a power guarantee calculation, a hardware performance tracking algorithm, etc.).

By this architecture, the data deliberation micro service 632 in the cloud platform will load the appropriate manifest assembly for processing a received data packet based on the customer from which the data was received, as well as other data attributes—such as the customer facility or site, a device from which the data was received, the type of data (e.g., alarm data, historian data, live data from industrial devices, etc.), a specified process or metric, etc.—identified by the header of the compressed data packet. By encapsulating collected data on the plant floor to include these attributes prior to sending the data to the cloud, the edge device 106 effectively applies a customer-specific model to the data that describes the data's context within the plant hierarchy, as well as the data's relationship to other data items across the enterprise. This information can then be leveraged on the cloud side to appropriately handle and process the data based on the data's role in the larger enterprise as well as user-defined processing and storage preferences.

FIG. 9 illustrates an example cloud-level system manifest 804. As shown, the system manifest 804 conforms to a hierarchical structure wherein levels of the hierarchy can be navigated based on data provided in the data packet header. The system manifest can include links to one or more available data manifests and metrics manifests that can be selectively invoked to process data received from the edge devices on the plant floor. The system manifest includes hierarchical levels for customer ID 902, site ID 904, and virtual support engineer (VSE) ID 906. Multiple customers, sites, and VSEs can be defined within each of the respective levels, and a particular tag manifest and metrics manifest can be associated with a given customer, site, and VSE. As shown in the example system manifest 804, a particular metrics manifest 908 and tag manifest 910 is associated with a customer ID 902, site ID 904, and VSE ID 906. Additional hierarchical levels for message type 912 and process ID 914 are used by the worker role to identify the respective namespaces 916 and associated assembly files that define how the data is to be processed by the cloud-based data process services. In the example illustrated in FIG. 9, Alarm data is associated with the namespace CoreProcessAssembly.AlarmDataProcess (assembly file name CoreProcessAssembly.dll), while Historical data is associated with the namespace CoreProcessAssembly.HistoricalDataProcess.

FIG. 10 illustrates an example cloud-level data manifest 806, which identifies the data to be operated on by the identified metrics. In this example, the data is identified using tag names 1002 that specify the data to be extracted from one or both of the compressed data packet or cloud-based customer storage. The data manifest 806 also defines one or more application IDs 1008 representing applications that can be invoked and executed on the data. The application IDs 1008 are respectively defined in terms of one or more process IDs 1004 corresponding to stored generic procedures that will be executed on the data when the corresponding application ID is invoked. In the example data manifest illustrated in FIG. 10, application ID 1.1 (named "TurboExpander1") comprises three processes—process ID 1 ("NetPower"), process ID 2 ("CycleEfficiency"), and process ID 3 ("PowerGuarantee"). These processes—which correspond to universal, generic procedure code stored on the cloud platform—will be applied to the data corresponding to the tag names 1002 when the TurboExpander1 application is invoked.

Controller IDs 1006 representing controllers from which some or all of the data was retrieved are also defined in the data manifest 806. In this example, each tag name definition also specifies which of the process IDs 1004 and controller ID 1006 own the data corresponding to the tag.

FIG. 11 illustrates an example cloud-level metrics manifest 808, which defines the coefficients, thresholds, and ranges to be used for each of the analytic procedures (metrics) specified in by the process IDs 1004 in the data manifest 806. For each metric ID 1102 (corresponding to the process IDs defined in the data manifest 806), a set of coefficients 1104 and thresholds 1106 are defined. For each defined coefficient, the metrics manifest 1100 defines a coefficient name, a unit, and a value. For each defined threshold, the metrics manifest 1100 defines a value and a unit.

As noted above, cloud-level analytics—which can be stored as generic procedures on the cloud platform and accessed in accordance with cloud-level metrics manifest 808—can be seen as having a scope that is a level higher in abstraction relative to edge-level analytics carried out by edge device 106 (specifically, by edge analytics component 212), and that has a less rapid response time requirement relative to edge-level and control-level analytics. Example cloud-level analytics can include, for example, analytics that track position error accumulation in electro-pneumatic actuators or other moving devices comprising an automation system. Such position errors, as well as other gradual hardware performance degradations, typically manifest slowly over time. Cloud-level analytics implemented by cloud analytics component 306 can be configured to detect such gradual degradations, and to generate notifications and/or send corrective or compensative instructions to the edge device 106 in response to determining that the equipment has degraded to a degree that merits a maintenance action.

Figure 12:
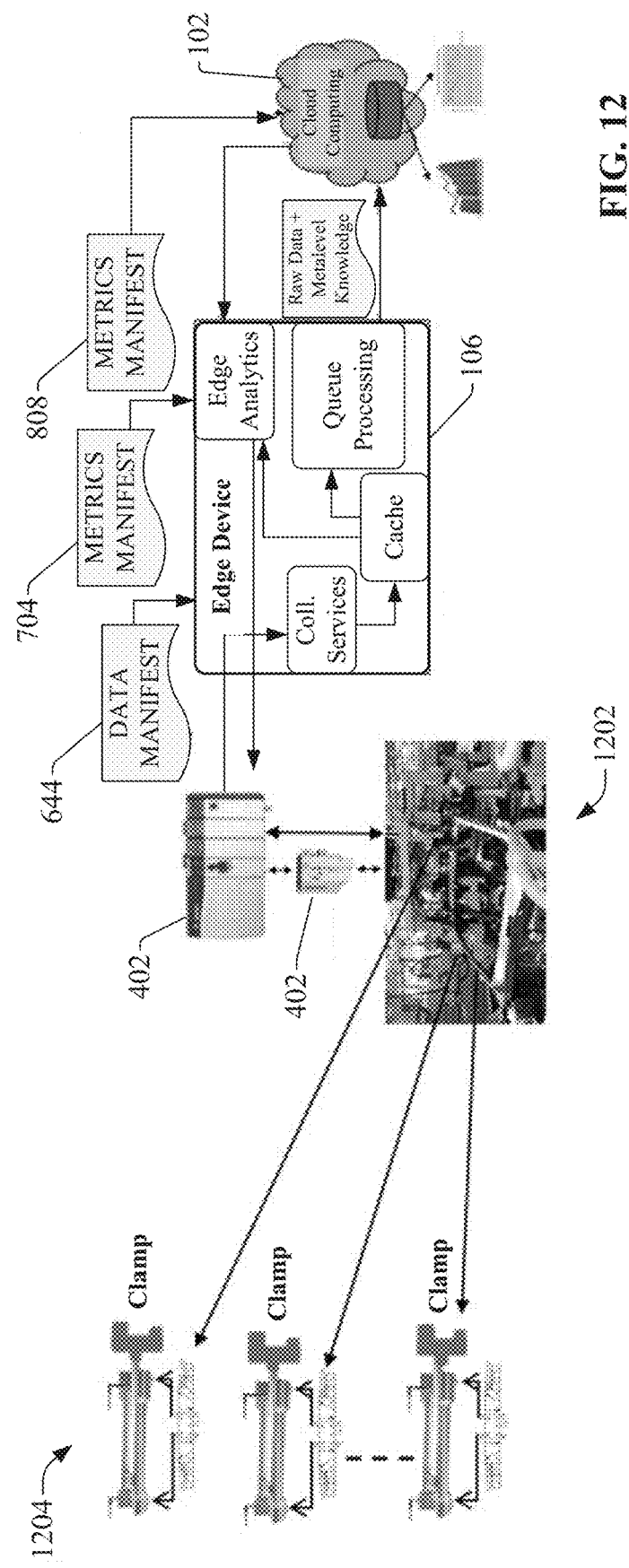
FIG. 12 is a diagram illustrating the use of edge-level and cloud-level analytics to monitor a vehicle body assembly system comprising a number of electro-pneumatic actuators.

FIG. 12 is a diagram illustrating the use of edge-level and cloud-level analytics to monitor a vehicle body assembly system 1202 comprising a number of electro-pneumatic actuators 1204. In this example, an industrial controller 402 monitors and controls aspects of the controlled automation system 1202 (including performing supervisory control of motor drive 404). As described in previous examples, an edge device 106 is communicatively connected to the industrial controller 402, and executes data collection services (implemented by collection services component 204), queue processing services (implemented by queue processing component 206), and edge-level analytics (implemented by edge analytics component 212). Edge device 106 also interfaces with cloud platform 102 executing cloud analytics system 302 (see FIG. 3). Data manifest file 644 defines the data tags on controller 402 from which real-time data is to be collected by the edge device 106, and edge-level metrics manifest file 704 defines edge-level analytics to be performed on subsets of the collected data.

In the illustrated example, vehicle body assembly system 1202 comprises a number of electro-pneumatic actuators 1204 that advance and retract arm-mounted clamps. The hybrid architecture tracks various performance aspects of the actuators 1204 using a combination of edge-level analytics (defined by edge-level metrics manifest 704) and cloud-level analytics (defined by cloud-level metrics manifest 808). These edge-level and cloud-level analytics are carried out by edge device 106 and cloud analytics system 302 executing on cloud platform 102 as substantially real-time control of the automation system 1202 is being performed by industrial controller 402.

For example, edge-level analytics may be used to track hardware anomalies in the respective electro-pneumatic actuators 1204 and their associated pneumatic systems. As described above, these anomalies can include air pipe bursts or compressed air leaks, which may result in over-clamping or stack clamp conditions. In an example technique, pressure values representing air pressure within the pneumatic lines that feed the electro-pneumatic actuators 1204 can be collected by collection services component 204, and edge-level analytics implemented by edge analytics component 212 (and defined by metrics manifest file 704) can monitor these values over time. The edge analytics defined by metrics manifest file 704 can be configured to identify characteristic pressure trends or patterns within the monitored pressure data indicative of an air pressure leak or pipe burst.

In response to detecting such a condition, edge analytics component 212 can be configured to initiate one or both of a notification and/or a countermeasure action. In the case of a notification, queue processing component 206 can send notification data to the cloud platform 102, where reporting services 614 (see FIG. 6) can send an alarm message to client devices associated with selected plant personnel determined to be qualified to address the detected issue. In some embodiments, reporting services 614 may generate a graphical representation of the electro-pneumatic systems and render a graphical indication identifying the affected air line or electro-pneumatic actuator.

Edge analytics component 212 can also generate a control instruction directed to the industrial controller 402 in response to detecting the issue. Edge-level metrics manifest 704 can define suitable control actions to be performed for respective different types of detected issues. For example, metrics manifest 704 may define that, in response to detecting a possible pressure leak or air line burst, controller 402 should be instructed to modify control of automation system 1202 such that the affected electro-pneumatic actuator is bypassed or used less frequently during the work cycle. In addition or alternatively, metrics manifest 704 may define that overall operation of the automation system 1202 is to be slowed relative to normal operation in order to minimize further equipment degradation until corrective maintenance can be performed. Other actions are also possible, including but not limited to modification of setpoint values. Based on the action to be performed, edge device 106 can send a suitable instruction to controller 402 to implement the countermeasure.

In addition to real-time control performed by controller 402 and edge-level analytics performed by edge device 106, cloud analytics system 302 executing on cloud platform 102 can perform cloud-level analytics defined by metrics manifest 808. Cloud-level analytics can be used to track and detect issues that manifest more gradually over time relative to issues identified by control-level and edge-level monitoring. For example, cloud-level analytics may be used to track accumulation of position error for the electro-pneumatic actuators 1204. Such position errors may arise gradually within the actuators due to equipment wear, which can cause the fully extended or retracted positions to drift over time. To track such position errors, queue processing component 206 of edge device 106 can send a subset of the collected controller data to the cloud platform, where the subset of controller data includes position data for the electro-pneumatic actuators 1204. This position data can comprise analog values representing the positions of the actuators when fully extended and/or fully retracted. This position data can be collected by edge device 106 each time the actuators are moved between their fully extended and fully retracted positions.

On cloud platform 102, cloud analytics component 306 can trend these position values over time and identify patterns within the trend data indicative of a degradation in position accuracy sufficient to merit a maintenance action. In some embodiments, cloud analytics component 306 can use machine learning to detect such abnormal parameters. In such embodiments, cloud analytics component 306 can consider the stochastic nature of the manufacturing assembly process, and implement statistical process control (SPC) to monitor performance of the actuators 1204. To this end, a model of the automation system 1202 can be created and trained to recognize normal manufacturing operation performance. Actuator degradation can be modeled on the cloud platform 102 using a Weidbull distribution of performance or another modeling technique. Cloud analytics component 306 can compare trends of the actuator position data over time with the model of actuator degradation and, based on this comparison, identify when the position data trend for an actuator satisfies a condition indicative of an impending end of performance life. In response to determining that the position trend data satisfies this condition, cloud analytics component 306 can generate and deliver a notification to one or more client devices associated with qualified plant personnel, where the notification identifies the actuator whose accumulated position error has exceeded a threshold that merits recalibration or replacement of the actuator. As in previous edge-level analytic examples, cloud analytics component 306 can also send control modification instructions to the controller 402, via edge device 106, in response to detection of the issue, where the instruction can modify control of automation system 1202 to accommodate the detected issue (e.g., by bypassing the affected actuator or reducing its level of activity, by slowing the overall control process, etc.).

Cloud-level analytics can also be leveraged to generate other types of information based on control-level and edge-level data received from the edge devices 106. For example, cloud analytics component 306 can be configured to generate characteristic profiles of an industrial system based on analysis of data from one or more edge devices, including but not limited to equipment performance profiles, energy consumption profiles for equipment, workcells, or factories; product throughput profiles for assembly lines, workcells, or factories; or other models that characterize aspects of a controlled industrial system or factory.

The hybrid architecture described herein can augment plant floor manufacturing and control operations with high performance computing intelligence that learns from the control and process data generated by the industrial controllers 402 and other industrial devices. The hybrid system can establish runtime models from which a predictive maintenance system can be generated to prevent catastrophic system failures, and that can also serve to optimize system performance.

Figure 13A:
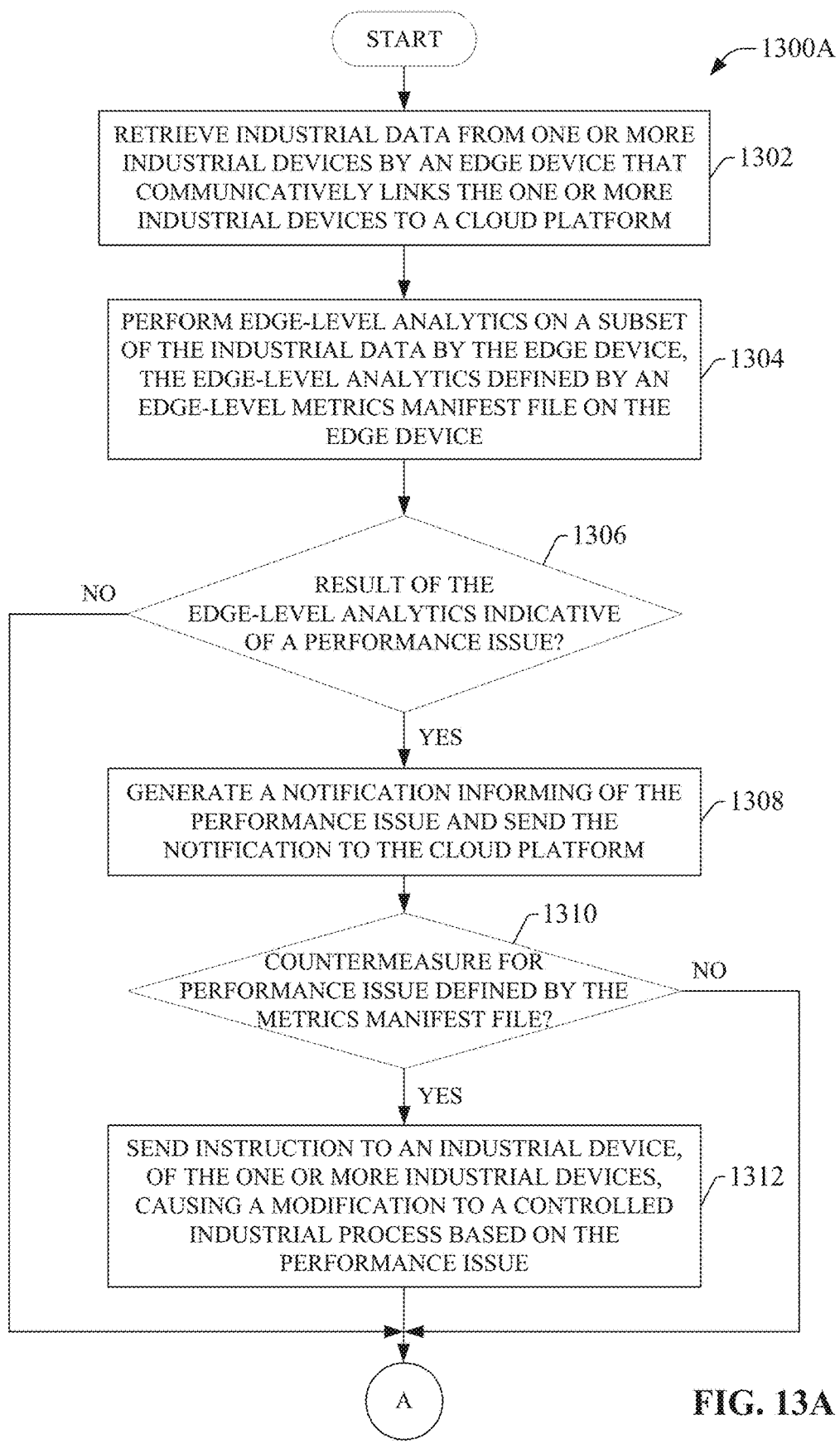
FIG. 13A is a flowchart of a first part of an example methodology for performing edge analytics and interacting with a cloud-based industrial analytic system.
Figure 13B:
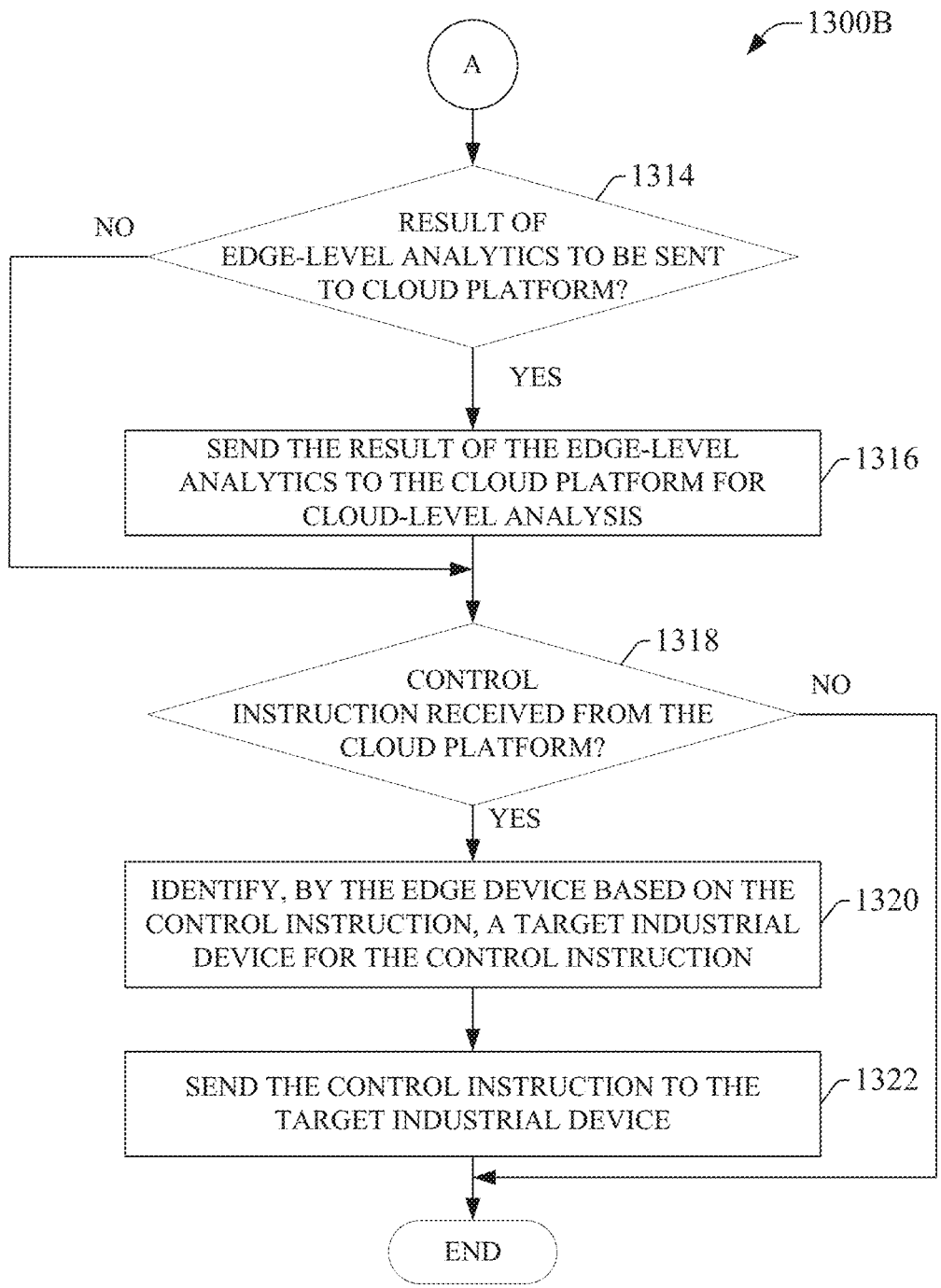
FIG. 13B is a flowchart of a second part of the example methodology for performing edge analytics and interacting with a cloud-based industrial analytic system.

FIGS. 13A-13B illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13A illustrates a first part of an example methodology 1300A implemented on an edge device (e.g., edge device 106) for performing edge analytics and interacting with a cloud-based industrial analytic system. Initially, at step 1302, industrial data is retrieved from one or more industrial devices by an edge device that communicatively links the one or more industrial devices to a cloud platform. The industrial devices can be, for example, industrial controllers, motor drives, telemetry devices, industrial subsystems such as vision systems or other quality verification systems, or other such equipment. At 1304, edge-level analytics are performed on a subset of the industrial data by the edge device, where the edge-level analytics are defined by an edge-level metrics manifest file deployed on the edge device. Edge-level analytics can be designed to carry out analytic operations that have less rigid response time requirements relative to control level operations. For example, edge-level analytics may be configured to detect unexpected equipment anomalies based on a monitoring of telemetry data (e.g., pressures, flows, temperatures, etc.). In the case of pneumatic equipment, such anomalies may include air pressure leaks, ruptures in air lines that feed the pneumatic equipment, or other such anomalies.

At 1306, a determination is made as to whether a result of the edge-level analytics is indicative of a performance issue (e.g., a pressure leak, an air line breakage, etc.). If the result of the edge-level analytics is indicative of a performance issue (YES at step 1306), the methodology moves to step 1308, where a notification is generated by the edge device informing of the performance issue, and the notification is sent by the edge device to the cloud platform, which can relay the notification to one or more client devices associated with appropriate plant personnel. At 1310, a determination is made as to whether the metrics manifest file on the edge device defines a countermeasure for the performance issue detected at step 1306. If a countermeasure is defined (YES at step 1310), the methodology proceeds to step 1312, where an instruction is sent by the edge device to an industrial device, the instruction causing a modification of a controlled industrial process based on the performance issue. The instruction may be, for example, an instruction to bypass a device affected by the performance issue, an instruction to slow a controlled industrial process in order to minimize the risk of escalating the performance issue, or other such instructions. The methodology then proceeds to the second part of the methodology 1300B illustrated in FIG. 13B.

If the result of the edge-level analytics is not indicative of a performance issue (NO at step 1306), or there is no countermeasure for the identified performance issue defined by the metrics manifest file (NO at step 1310), the methodology proceeds to the second part of the methodology 1300B without performing intermediate steps.

The second part of the methodology 1300B begins at step 1314, where a determination is made as to whether the result of the edge-level analytics is to be sent to the cloud platform for further processing. This determination can be a function of the edge-level analytic result based on criteria defined in the edge-level metrics manifest. If the result of the edge-level analytics is to be sent to the cloud platform (YES at step 1314), the methodology proceeds to step 1316, where the result of the edge-level analytics is sent by the edge device to the cloud platform for processing by cloud-level analytics. If the result of the edge-level analytics is not to be sent to the cloud platform (NO at step 1314), the methodology skips step 1316.

At 1318, a determination is made as to whether a control instruction has been received at the edge device from the cloud platform. The control instruction may have been generated by a cloud-level analytics application based on a result of cloud-level analysis of industrial data. If a control instruction is received from the cloud platform (YES at step 1318), the methodology proceeds to step 1320, where a target industrial device for the control instruction is identified by the edge device based on the control instruction. For example, the control instruction may include an identifier of the target industrial device, which can be used by the edge device to rout the control instruction to the correct destination device (e.g., an industrial controller, a motor drive, etc.). At 1322, the control instruction is sent by the edge device to the target industrial device identified at step 1320.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
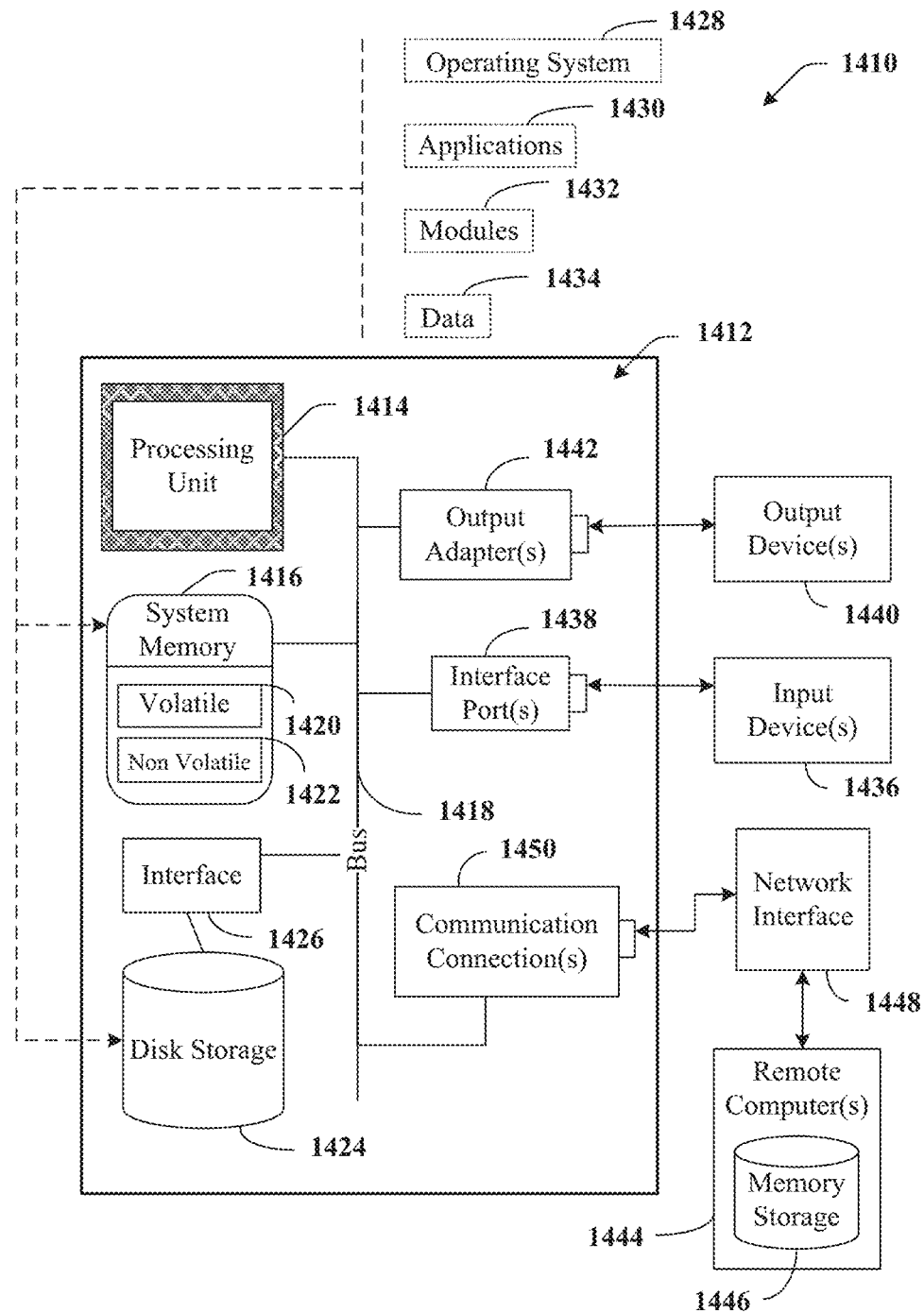
FIG. 14 is an example computing environment.
Figure 15:
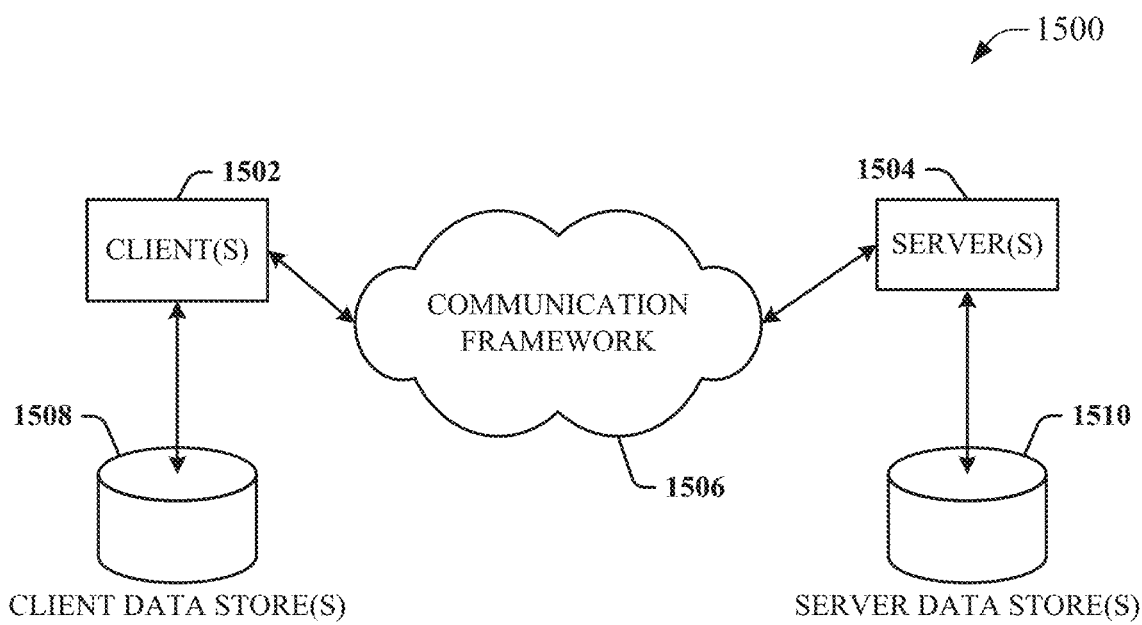
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s)

1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An edge device, comprising:
 a memory that stores executable components;
 a processor, operatively coupled to the memory, that executes the executable components, the executable components comprising:
  a collection services component configured to collect industrial data from data tags of an industrial device and to generate a compressed data file containing the industrial data, wherein the data tags from which the industrial data is collected are defined by an edge-level data manifest file;

a queue processing component configured to package the compressed data file with header information based on message queuing information maintained in a message queuing data store to yield a compressed data packet and to send the compressed data packet to a cloud analytics system executing on a cloud platform; and an edge analytics component configured to perform an edge-level analytic procedure on a first subset of the industrial data to yield a first analytic result, wherein the edge-level analytic procedure is defined by an edge-level metrics manifest file, wherein the edge analytics component is configured to send a first command to the industrial device based on the first analytic result, the queue processing component is further configured to receive a second analytic result from the cloud analytics system, wherein the second analytic result is generated based on a cloud-level analytic procedure performed by the cloud analytics system that identifies a pattern in a trend of a second subset of the industrial data indicative of a loss of position accuracy of an actuator, and the edge analytics component is further configured to send a second command to the industrial device based on the second analytic result.

2. The edge device of claim 1, wherein the pattern is a first pattern, and the edge-level analytic procedure is configured to identify a second pattern in the first subset of the industrial data indicative of an equipment anomaly, and to configure the first command to alter a controlled industrial process in response to identification of the second pattern.

3. The edge device of claim 2, wherein the edge-level analytic procedure is configured to identify, as the equipment anomaly based on the second pattern, a pneumatic air leak.

4. The edge device of claim 2, wherein the edge analytics component is further configured to send notification data to the cloud analytics system in response to identification of the second pattern.

5. The edge device of claim 1, wherein the edge analytics component is configured to generate the second command to alter a controlled industrial process to compensate for the loss of the position accuracy.

6. The edge device of claim 5, wherein the second command is configured to at least one of modify a machine cycle of the controlled industrial process to favor a different actuator or slow an actuation time of the actuator.

7. The edge device of claim 1, wherein the accuracy of actuator is an electro-pneumatic actuator.

8. The edge device of claim 1, wherein the cloud-level analytic procedure performs a comparison of the trend of the second subset of the industrial data with a model of performance degradation of the actuator, and generates the second command based on a result of the comparison.

9. The edge device of claim 1, further comprising a user interface component configured to send a notification of the second analytic result to a client device, wherein the edge analytics component is configured to send the second command to the industrial device in response to receipt of confirmation input from the client device.

10. A method for processing industrial data, comprising:
collecting, by a system comprising a processor, industrial data from data tags of an industrial device, wherein the data tags from which the industrial data is collected are identified by an edge-level data manifest file;

generating, by the system, a compressed data file containing the industrial data;

adding, by the system, header information to the compressed data file to yield a compressed data packet, wherein the header information is based on message queuing information maintained in a message queuing data store to yield a compressed data packet;

sending, by the system, the compressed data packet to a cloud analytics system executing on a cloud platform;

performing, by the system, an edge-level analytic procedure on a first subset of the industrial data to yield a first analytic result, wherein the edge-level analytic procedure is defined by an edge-level metrics manifest file;

sending, by the system, a first command to the industrial device based on the first analytic result;

receiving, by the system, a second analytic result from the cloud analytics system, wherein the second analytic result is generated based on a cloud-level analytic procedure performed by the cloud analytics system that identifies a pattern in a time-based trend of a second subset of the industrial data, the pattern indicative of a loss of position accuracy of an actuator; and sending, by the system, a second command to the industrial device based on the second analytic result.

11. The method of claim 10, wherein
the pattern is a first pattern,
the performing of the edge-level analytic procedure comprises identifying a second pattern in the first subset of the industrial data corresponding to an equipment anomaly, and
the sending the first command comprises configuring the first command to alter a controlled industrial process in response to identification of the second pattern.

12. The method of claim 11, wherein the identifying of the second pattern comprises identifying, as the equipment anomaly, a pneumatic air leak.

13. The method of claim 11, further comprising sending a notification to the cloud analytic system in response to the identifying of the second pattern.

14. The method of claim 10, wherein the sending the second command comprises generating the second command to alter a controlled industrial process based on the loss of the position accuracy.

15. The method of claim 10, wherein the actuator is an electro-pneumatic actuator.

16. The method of claim 10, wherein the adding of the header information comprises adding at least a customer identifier associated with the industrial enterprise and priority information specifying a processing priority for the industrial data.

17. The method of claim 10, wherein the sending the second command comprises generating the second command to at least one of modify a machine cycle controlled by the industrial device to favor a different actuator or slow an actuator time of the actuator.

18. A non-transitory computer-readable medium having stored thereon instructions that, in response to execution, cause an edge device comprising a processor to perform operations, the operations comprising:

collecting industrial data from data tags of an industrial device, wherein the data tags from which the industrial data is collected are defined by an edge-level data manifest file;

generating a compressed data file containing the industrial data;

appending header information to the compressed data file to yield a compressed data packet, wherein the header information is based on message queuing information maintained in a message queuing data store to yield a compressed data packet;

sending the compressed data packet to a cloud analytics system executing on a cloud platform;

performing an edge-level analytic procedure on a first subset of the industrial data to yield a first analytic result, wherein the edge-level analytic procedure is defined by an edge-level metrics manifest file;

sending a first control instruction to the industrial device based on the first analytic result;

receiving a second analytic result from the cloud analytics system, wherein the second analytic result is generated based on a cloud-level analytic procedure performed by the cloud analytics system that identifies a pattern in a trend of a second subset of the industrial data, the pattern indicative of a loss of position accuracy of an actuator; and sending a second control instruction to the industrial device based on the second analytic result.

19. The non-transitory computer-readable medium of claim 18, wherein the pattern is a first pattern, the performing the edge-level analytic procedure comprises identifying a second pattern in the first subset of the industrial data corresponding to an equipment anomaly, and the sending the first control instruction comprises configuring the first command to alter a controlled industrial process in response to identification of the second pattern.

20. The non-transitory computer-readable medium of claim 19, wherein the identifying the second pattern comprises identifying, as the equipment anomaly, a pneumatic air leak.

* * * * *